United States Patent (10) Patent No.: US 9,813,550 B2
Kim et al. (45) Date of Patent: Nov. 7, 2017

(54) LAWFUL INTERCEPTION METHOD AND APPARATUS OF D2D COMMUNICATION-CAPABLE TERMINAL

(71) Applicant: Samsung Electronics Co., Ltd., Suwon-si, Gyeonggi-do (KR)

(72) Inventors: Kyungkyu Kim, Suwon-si (KR); Youngbin Chang, Anyang-si (KR); Anil Agiwal, Suwon-si (KR); Seunghoon Park, Seoul (KR); Sangkyu Baek, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 111 days.

(21) Appl. No.: 14/325,791

(22) Filed: Jul. 8, 2014

(65) Prior Publication Data
US 2015/0009864 A1 Jan. 8, 2015

(30) Foreign Application Priority Data

Jul. 8, 2013 (KR) .................. 10-2013-0079932
Jan. 29, 2014 (KR) .................. 10-2014-0011547
May 15, 2014 (KR) .................. 10-2014-0058636

(51) Int. Cl.
*H04M 3/22* (2006.01)
*H04L 29/06* (2006.01)
*H04W 12/02* (2009.01)
*H04M 3/42* (2006.01)
*H04W 4/02* (2009.01)

(52) U.S. Cl.
CPC ........ *H04M 3/2281* (2013.01); *H04L 63/306* (2013.01); *H04W 12/02* (2013.01); *H04M 3/42* (2013.01); *H04W 4/02* (2013.01)

(58) Field of Classification Search
CPC ............................ H04M 3/2281; H04M 3/42
See application file for complete search history.

(56) References Cited

U.S. PATENT DOCUMENTS

2007/0297376 A1 12/2007 Gass
2007/0297418 A1* 12/2007 Lee .................. H04L 63/00
370/395.52

(Continued)

FOREIGN PATENT DOCUMENTS

KR 10-2012-0072035 A 7/2012

OTHER PUBLICATIONS

Institute for Information Industry (III), "Anonymously multi-party communication interception", S1-120070, 3GPP TSG-SA WG1 Meeting #57, Feb. 13-17, 2012, pp. 1-3, Kyoto, Japan.

(Continued)

*Primary Examiner* — Benjamin H Elliott, IV
*Assistant Examiner* — Brian Cox
(74) *Attorney, Agent, or Firm* — Jefferson IP Law, LLP

(57) ABSTRACT

A Lawful Interception (LI) method performed between a network and a terminal operating in Device-to-Device (D2D) communication mode to intercept D2D communication content are provided. The lawful interception method includes a D2D communication terminal according to the present disclosure includes activating a lawful interception function, storing information exchanged with a peer terminal through D2D communication, and transmitting a lawful interception report including the stored information.

18 Claims, 18 Drawing Sheets

(56) References Cited

U.S. PATENT DOCUMENTS

| | | | |
|---|---|---|---|
| 2012/0167165 A1 | 6/2012 | Kim et al. | |
| 2012/0294163 A1 | 11/2012 | Turtinen et al. | |
| 2013/0288668 A1* | 10/2013 | Pragada | H04W 12/06 455/426.1 |
| 2014/0364079 A1* | 12/2014 | DiFazio | H04W 88/04 455/404.1 |
| 2015/0139087 A1* | 5/2015 | Luft | H04W 52/0251 370/329 |
| 2016/0127420 A1* | 5/2016 | Yu | H04L 63/304 726/30 |

OTHER PUBLICATIONS

Institute for Information Industry (III), "Proximity aware service consideration on lawful interception", S1-120068, 3GPP TSG-SA WG1 Meeting #57, Feb. 13-17, 2012, pp. 1-3, Kyoto, Japan.

* cited by examiner

LAWFUL INTERCEPTION METHOD AND APPARATUS OF D2D COMMUNICATION-CAPABLE TERMINAL

CROSS-REFERENCE TO RELATED APPLICATION(S)

This application claims the benefit under 35 U.S.C. §119 (a) of a Korean patent application filed on Jul. 8, 2013 in the Korean Intellectual Property Office and assigned Serial number 10-2013-0079932, and of a Korean patent application filed on Jan. 29, 2014 in the Korean Intellectual Property Office and assigned Serial number 10-2014-0011547, and of a Korean patent application filed on May 15, 2014 in the Korean Intellectual Property Office and assigned Serial number 10-2014-0058636, the entire disclosure of each of which is hereby incorporated by reference.

TECHNICAL FIELD

The present disclosure relates to a lawful inception method and apparatus of a Device-to-Device (D2D) communication-capable terminal. More particularly, the present disclosure relates to a lawful interception method performed between a network and a terminal operating in D2D communication mode to intercept D2D communication content.

BACKGROUND

Recently, Device-to-Device (D2D) communication arises as a technique for communicating signals and data between terminals (devices) through a direct communication link without involvement of any network entity such as base station.

A D2D communication-capable terminal acquires synchronization with adjacent terminals and then discovers nearby terminals using a predetermined resource a predetermined time point. Next, the terminal acquires the device information on the discovered nearby terminals to start D2D communication. The device information may include identity information of the discovered device, interest, and application program information. When the D2D communication-capable terminal operates in connection with the base station, the terminal discovers the nearby terminal according to the configuration based on the time and resource information provided by the base station.

Meanwhile, Lawful Interception (LI) is the collecting of telecommunication data pursuant lawful authority for various reasons such as public interest and criminal arrest. Most countries have passed laws that require the telecommunications service providers to support the lawful inception of the law enforcement agencies. For lawful inception, the law enforcement agency collects data or voice signals distinguished between Content of Communication (CC) and Interception Related Information (IRI) associated with sessions initiated by a specific LI target.

In North America, Communications Assistance for Law Enforcement Act (CALEA) specifies LI. Recently, LI is performed even for the data communication service such as Voice over Internet Protocol (VoIP) as well as the voice communication service through cellular communication network.

In the Long Term Evolution (LTE) system, the data and voice are exchanged between User Equipment (UE) and Evolved Packet Core (EPC). Accordingly, the LI to a specific UE is performed in such a way that the Law Enforcement Monitoring Facility (LEMF) of the law enforcement agency receives information from an entity (e.g., P-GW) located at the termination of the LTE operator's network.

In the D2D communication in which the D2D UEs do not use the operator's network, allying the LI technology according to the related art without modification is difficult. In addition, there is a need of a technology capable of protecting against information distortion such as deformation and missing.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure provides a lawful interception method applicable to the Device-to-Device (D2D) communication.

In accordance with an aspect of the present disclosure, a lawful interception method of a D2D communication terminal is provided. The lawful interception method includes activating a lawful interception function, storing information exchanged with a peer terminal through D2D communication, and transmitting a lawful interception report including the stored information.

In accordance with another aspect of the present disclosure, a lawful interception method of a D2D communication terminal is provided. The lawful interception method includes transmitting to a network a resource allocation request for D2D communication with a peer terminal, receiving a lawful interception report command instructing to establish a D2D communication link and a link between the D2D communication terminal and the network simultaneously from the network, and transmitting D2D communication data to the peer terminal and the network.

In accordance with another aspect of the present disclosure, a lawful interception method of a base station for a D2D communication terminal is provided. The lawful interception method includes receiving a lawful interception activation command for the D2D communication terminal from a core network, receiving a resource allocation request for D2D communication from the D2D communication terminal, transmitting to the D2D communication terminal a lawful interception report command instructing to set the transmission power to a level available for lawful interception, overhearing data transmitted from the D2D communication terminal to a peer terminal through a D2D communication link, and transmitting a lawful interception report to the core network.

In accordance with another aspect of the present disclosure, a lawful interception method of a base station for a D2D communication terminal is provided. The lawful interception method includes receiving a lawful interception activation command for the D2D communication terminal from a core network, receiving a resource allocation request for D2D communication from the D2D communication terminal, transmitting to the D2D communication terminal a lawful interception report command instructing to establish a D2D communication link and a link between the D2D communication terminal and the network simultaneously, and receiving data of the D2D communication from the D2D communication terminal.

In accordance with another aspect of the present disclosure, a lawful interception method of a proxy terminal for a target terminal performing D2D communication is provided. The lawful interception method includes receiving discovery information for lawful interception to the target terminal from a core network, determining a discovery signal of the target terminal based on the discovery information, locking on the target terminal, and acquiring information occurring in the D2D communication of the target terminal.

In accordance with another aspect of the present disclosure, a lawful interception method of an interception device for a target terminal performing D2D communication is provided. The lawful interception method includes performing authentication for lawful interception to a core network to which the target terminal belongs, receiving information on the target terminal from the core network, transmitting a lawful interception activation command to the core network based on the target terminal information, and receiving a lawful interception report including lawfully intercepted data associated with the target terminal.

In accordance with another aspect of the present disclosure, a lawful interception report apparatus of a D2D communication terminal is provided. The lawful interception apparatus includes a transceiver configured to transmit and receive one or more of signals and data to and from a network and a control unit configured to activate a lawful interception function, to store information exchanged with a peer terminal through D2D communication, to transmit a lawful interception report including the stored information.

In accordance with another aspect of the present disclosure, a lawful interception report apparatus of a D2D communication terminal is provided. The lawful interception apparatus includes a transceiver configured to transmit and receive one or more of signals and data to and from a network and a control unit configured to transmit to a network a resource allocation request for D2D communication with a peer terminal, to receive a lawful interception report command instructing to establish a D2D communication link and a link between the D2D communication terminal and the network simultaneously from the network, and to transmit D2D communication data to the peer terminal and the network.

In accordance with another aspect of the present disclosure, a lawful interception report apparatus of a base station for a D2D communication terminal is provided. The lawful interception report includes a transceiver configured to transmit and receive one or more of signals and data to and from the terminal, an interface unit configured to transmit and receive one or more of signals and data with a core network, and a control unit configured to receive a lawful interception activation command for the D2D communication terminal from a core network, receiving a resource allocation request for D2D communication from the D2D communication terminal, to transmit to the D2D communication terminal a lawful interception report command instructing to set the transmission power to a level available for lawful interception, to overhear data transmitted from the D2D communication terminal to a peer terminal through a D2D communication link, and to transmit a lawful interception report to the core network.

In accordance with another aspect of the present disclosure, a lawful interception device of a base station for a D2D communication terminal is provided. The lawful interception device includes a transceiver configured to transmit and receive one or more of signals and data to and from the terminal, an interface unit configured to transmit and receive one or more of signals and data with a core network, and a control unit configured to receive a lawful interception activation command for the D2D communication terminal from a core network, to receive a resource allocation request for D2D communication from the D2D communication terminal, to transmit to the D2D communication terminal a lawful interception report command instructing to establish a D2D communication link and a link between the D2D communication terminal and the network simultaneously, and to receive data of the D2D communication from the terminal.

In accordance with another aspect of the present disclosure, a lawful interception device of a proxy terminal for a target terminal performing D2D communication is provided. The lawful interception device includes a transceiver configured to transmit and receive one or more of signals and data to and from the target terminal through D2D communication, and a control unit configured to receive discovery information for lawful interception to the target UE from a core network, determining a discovery signal of the target terminal based on the discovery information, to lock on the target terminal, and to acquire information occurring in the D2D communication of the target terminal.

In accordance with another aspect of the present disclosure, a lawful interception device for performing interception to a target terminal performing D2D communication is provided. The lawful interception device includes an interface unit configured to transmit and receive one or more of signals and data to and from a core network to which the target terminal belong, and a control unit configured to perform authentication for lawful interception to the core network, to receive information on the target terminal from the core network, to transmit a lawful interception activation command to the core network based on the target terminal information, and to receive a lawful interception report including lawfully intercepted data associated with the target terminal.

In accordance with another aspect of the present disclosure, a lawful interception method of a network entity for performing lawful interception to a D2D communication terminal is provided. The lawful interception method includes receiving a lawful interception activation command for the D2D communication terminal from a law enforcement agency, determining at least one of D2D capability and D2D activation of the D2D communication terminal, and preparing to enable lawful interception depending on at least one of the D2D capability and the D2D activation of the D2D communication terminal.

In accordance with still another aspect of the present disclosure, a network entity for performing lawful interception to a terminal performing D2D communication is provided. The network entity includes a receiver which receives a lawful Interception activation command for the terminal from a law enforcement agency and a control unit which controls receiving a lawful interception activation command for the terminal from a law enforcement agency, determining at least one of D2D capability and D2D activation of the terminal, and preparing to enable lawful interception depending on at least one of the D2D capability and the D2D activation of the terminal.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
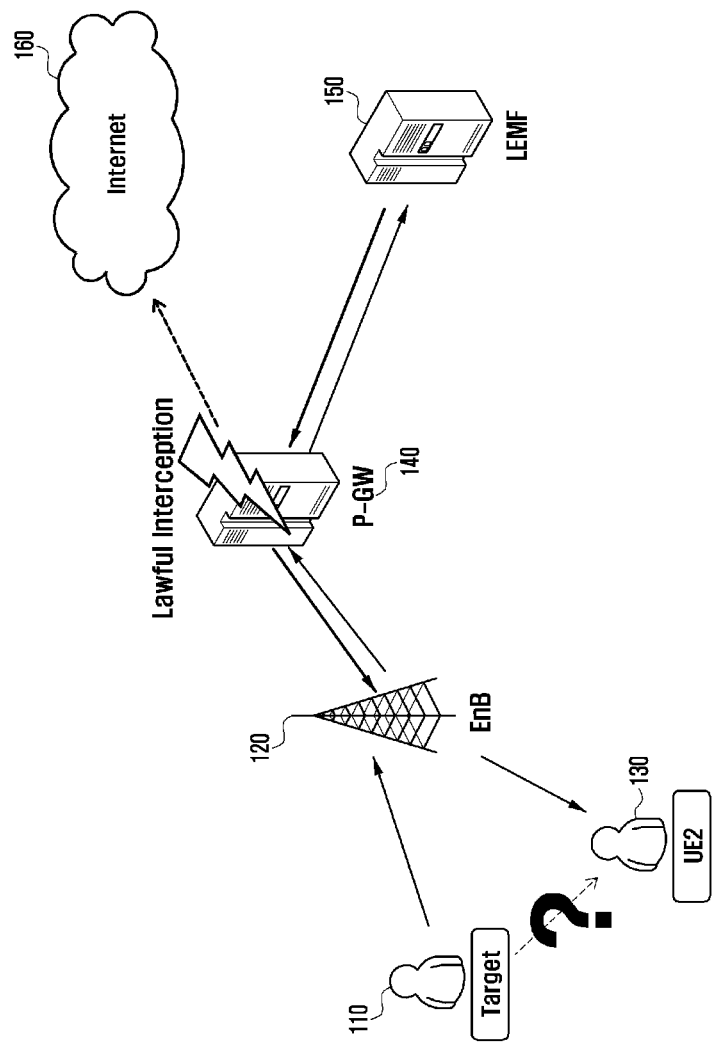
FIG. 1 is a diagram illustrating a procedure of the Lawful Interception (LI) according to the related art.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

For the same reason, some of elements are exaggerated, omitted or simplified in the drawings and the elements may have sizes and/or shapes different from those illustrated in drawings, in practice. The same reference numbers are used throughout the drawings to refer to the same or like parts.

According to various embodiments of the present disclosure, an electronic device may include communication functionality. For example, an electronic device may be a smart phone, a tablet Personal Computer (PC), a mobile phone, a video phone, an e-book reader, a desktop PC, a laptop PC, a netbook PC, a Personal Digital Assistant (PDA), a Portable Multimedia Player (PMP), an mp3 player, a mobile medical device, a camera, a wearable device (e.g., a Head-Mounted Device (HMD), electronic clothes, electronic braces, an electronic necklace, an electronic appcessory, an electronic tattoo, or a smart watch), and/or the like.

According to various embodiments of the present disclosure, an electronic device may be a smart home appliance with communication functionality. A smart home appliance may be, for example, a television, a Digital Video Disk (DVD) player, an audio, a refrigerator, an air conditioner, a vacuum cleaner, an oven, a microwave oven, a washer, a dryer, an air purifier, a set-top box, a TV box (e.g., Samsung HomeSync™, Apple TV™, or Google TV™), a gaming console, an electronic dictionary, an electronic key, a camcorder, an electronic picture frame, and/or the like.

According to various embodiments of the present disclosure, an electronic device may be a medical device (e.g., Magnetic Resonance Angiography (MRA) device, a Magnetic Resonance Imaging (MRI) device, Computed Tomography (CT) device, an imaging device, or an ultrasonic device), a navigation device, a Global Positioning System (GPS) receiver, an Event Data Recorder (EDR), a Flight Data Recorder (FDR), an automotive infotainment device, a naval electronic device (e.g., naval navigation device, gyroscope, or compass), an avionic electronic device, a security device, an industrial or consumer robot, and/or the like.

According to various embodiments of the present disclosure, an electronic device may be furniture, part of a building/structure, an electronic board, electronic signature receiving device, a projector, various measuring devices (e.g., water, electricity, gas or electro-magnetic wave measuring devices), and/or the like that include communication functionality.

According to various embodiments of the present disclosure, an electronic device may be any combination of the foregoing devices. In addition, it will be apparent to one having ordinary skill in the art that an electronic device according to various embodiments of the present disclosure is not limited to the foregoing devices.

According to various embodiments of the present disclosure, a User Equipment (UE), a Device-to-Device (D2D) communication-capable terminal, and/or the like may be an electronic device.

Although the description is directed to LTE and LTE-Advanced (LTE-A) systems, it will be understood by those skilled in the art that the present disclosure can be applied even to other communication systems having the similar technical background and channel format, with a slight modification, without departing from the spirit and scope of the present disclosure.

Prior to starting descriptions of embodiments of the present disclosure, a description is made of the LI technology according to the related art.

FIG. 1 is a diagram illustrating a procedure of the Lawful Interception (LI) according to the related art.

Referring to FIG. 1, when the LI target UE 110 communicates with the peer UE 130 through the evolved Node B (eNB) 120 and the Packet Data Network Gateway (P-GW) 140, Law Enforcement Monitoring Facility (LEMF) 150 of the law enforcement agency requests the P-GW 140 or the Serving Gateway (S-GW) for collecting communication content of the LI target UE 110. At this time, if the LI configuration information for collecting communication content of the LI target UE 110 is received from the Call Session Control Function (CSCF) in response to the LI request of the LEMF 150, the PGW 140 transmits the communication content of the LI target UE 110 to the LEMF 150 through the Internet 160.

In the case that the LI target UE 110 performs D2D communication with the peer UE 130 directly without network assistance, however, because the information exchanged between the UEs does not pass through the eNB 120, it is difficult for the LEMF 150 to collect the communication content.

The present disclosure proposes an LI method applicable to even to the LI target UE 110 operating in D2D communication mode.

Figure 2A:
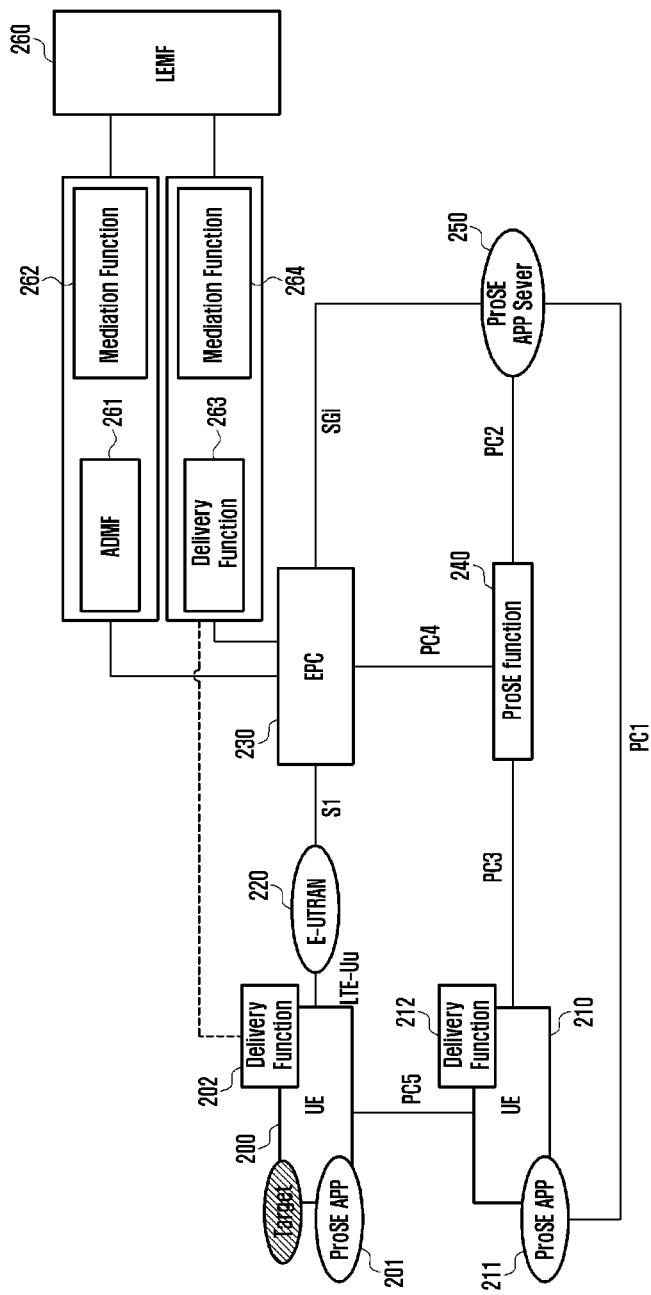
FIG. 2A is a diagram illustrating a system architecture according to an embodiment of the present disclosure.

FIG. 2A is a diagram illustrating the system architecture according to an embodiment of the present disclosure.

Referring to FIG. 2A, UEs 200 and 210 include a Proximity-based Services (ProSe) application 201 and 211 and connected to each other through a PC5 interface. The UEs 200 and 210 include a delivery function 202 and 212 for LI according to an embodiment of the present disclosure. The delivery function 202 of the LI target UE 200 matches the delivery function 263 of the law enforcement agency in a logical connection relationship. The delivery functions 202 and 212 may be called LI function.

The access network of the UEs 200 and 210 may be an Evolved Universal Terrestrial Radio Access Network (E-UTRAN) made up of eNBs of the LTE network. At this time, the server and Interception device of the LTE network may belong to separate operators' networks or one operator's network. The E-UTRAN 220 is connected to the UE 200 through LTE-Uu interface and to the EPC 230 as the core network through S1 interface.

The EPC 230 initiates interception to the LI target UE 200 in response to the D2D communication data inception request from the law enforcement agency. The interception may be initiated in such a way of extracting the identity information of the LI target UE 200 to set the LI standby state or storing the device information of the LI target UE 200.

The EPC 230 stays in the LI standby state for the LI target UE 200 and, if the LI target UE 200 requests the access network 220 for D2D communication, collects the Communication Content (CC) of the LI target UE 200 and transfers the CC to the Interception device.

The ProSe function 240 manages security and authentication and related information (e.g., discovery code) for D2D communication and discovery, and the ProSe App Server 250 is a server managing the information related to the ProSe Application 201 and 211 and operated by the third party developer or operator.

The law enforcement agency is provided with the LEMF 260 which connects to the Administration Function (ADMF) 261 responsible for controlling overall Interception process and the Delivery Function 263 responsible for delivering various Interception-related data.

The ADMF 261 is responsible for Interception management function (e.g., managing Interception-related commands), and transfers the Interception requirements for Interception-related control and bearer data to the delivery function 263.

The Interception-related control data may correspond to Interception Related Information (IRI), and the bearer data may correspond to Content of Communication (CC). The lawfully intercepted information may be distinguished between CC and IRI, and the CC denotes the communication content of plaintext exchanged between LI target UEs, and the IRI includes communication-related information indication whether the communication is successful, device discovery information, service-related information such as per-subscriber service profile, user location information, Layer 2 MAC and PDCP and Layer 3 IP information, and transmission and reception IDs.

Figure 2B:
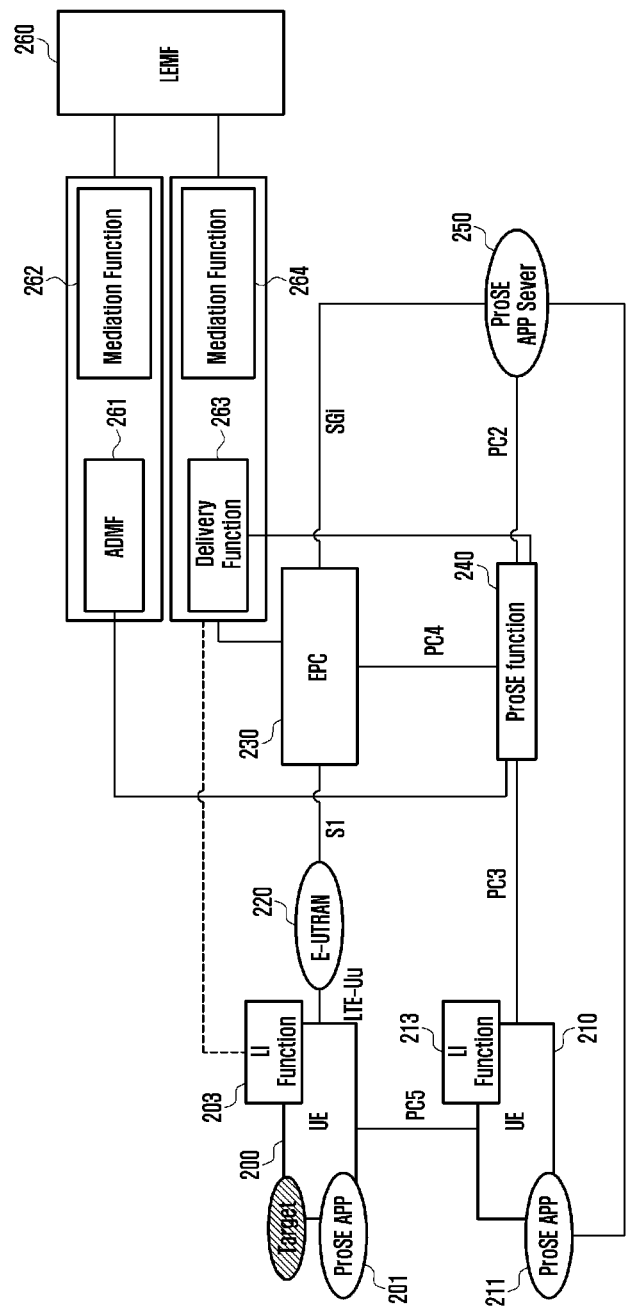
FIG. 2B is a diagram illustrating a system architecture according to an embodiment of the present disclosure.

FIG. 2B is a diagram illustrating the system architecture according to another embodiment of the present disclosure.

Referring to FIG. 2B, the UEs include a ProSe Application (APP) 201 and 211 for D2D communication and connected to each other through a PC5 interface. The UEs 200 and 210 has the LI function 203 and 213 for LI according to an embodiment of the present disclosure. The LI function 202 and 213 may be the same as or similar to the delivery function 202 and 212 for LI illustrated in FIG. 2A. The LI function 203 of the LI target UE 200 matches the delivery function 263 of the law enforcement agency to maintain logical connection relationship.

The access network of the UEs 200 and 210 may be an E-UTRAN made up of eNBs of the LTE network. At this time, the server and Interception device of the LTE network may belong to separate operators' networks or one operator's network. The E-UTRAN 220 is connected to the UE 200 through LTE-Uu interface and to the EPC 230 as the core network through S1 interface.

The ProSe function 240 manages security and authentication and related information (e.g., discovery code) for D2D communication and discovery, and the ProSe App Server 250 is a server managing the information related to the ProSe Application 201 and 211 and operated by the third party developer or operator.

The ProSe function 240 initiates interception to the LI target UE in response to the D2D communication data interception request from the law enforcement agency. The interception may be initiated in such a way of extracting the identity information of the LI target UE 200 to set the LI standby state or storing the device information of the LI target UE 200.

The ProSe function 240 stays in the LI standby state for the LI target UE 200 and, if the LI target UE 200 requests the access network 220 for D2D communication, collects the CC of the LI target UE 200 and transfers the CC to the Interception device.

The law enforcement agency is provided with the LEMF 260 which connects to the ADMF 261 responsible for controlling overall Interception process by means of the mediation functions 262 and 264 and the Delivery Function 263 responsible for delivering various Interception-related data.

The ADMF 261 is responsible for Interception management function (e.g., managing Interception-related commands), and transfers the Interception requirements for Interception-related control and bearer data to the delivery function 263. The delivery function 263 transfers the LI target UE control data input from the ADMF 261 and intercepted bearer data to the mediation function 264.

The Interception-related control data may correspond to IRI, and the bearer data may correspond to CC. The lawfully intercepted information may be distinguished between CC and IRI, and the CC denotes the communication content of plaintext exchanged between LI target UEs, and the IRI includes communication-related information indication whether the communication is successful, device discovery information, service-related information such as per-subscriber service profile, user location information, Layer 2 MAC and PDCP and Layer 3 IP information, and transmission and reception IDs.

Figure 3:
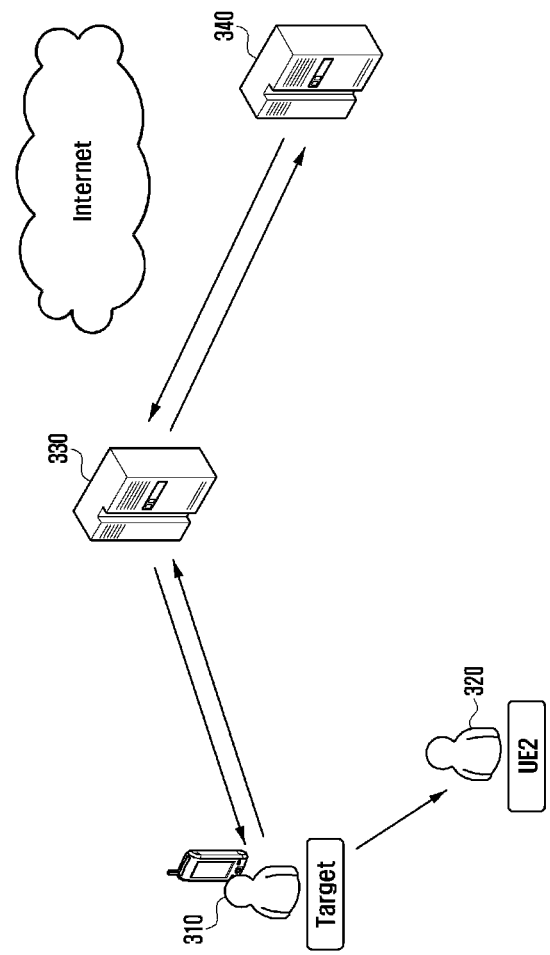
FIG. 3 is a diagram illustrating an overview of LI procedure according to first and second embodiments of the present disclosure.

FIG. 3 is a diagram illustrating an overview of LI procedure according to first and second embodiments of the present disclosure.

Referring to FIG. 3, the communication content and the interception-related information acquired in the course of the D2D communication between the LI target UE (hereinafter, interchangeably referred to as target UE) 310 and the peer UE 320 are transferred to the law enforcement agency 340 via the network entity 330 to which the target UE 310 is connected.

Figure 4:
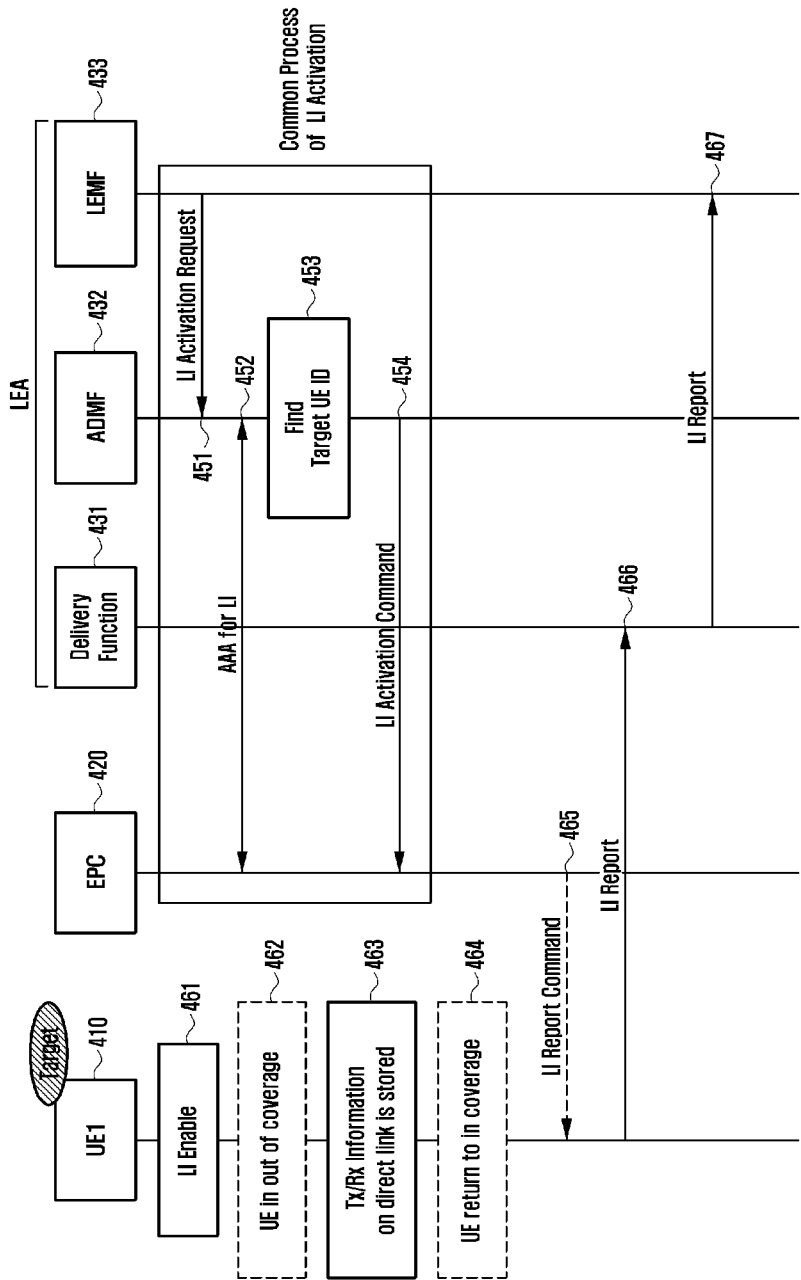
FIG. 4 is a signal flow diagram illustrating a lawful interception procedure according to the first embodiment of the present disclosure.

FIG. 4 is a signal flow diagram illustrating a lawful interception procedure according to the first embodiment of the present disclosure.

Referring to FIG. 4, at operation 451, the LEMF 433 of the Law Enforcement Agency (LEA) sends an LI Activation Request to the ADMF 432 as a controller. At operation 452, the ADMF 432 performs Authentication, Authorization, and Accounting (AAA) procedure with the EPC 420 as the core network. At operation 453, the ADMF 432 acquires the device information of the target UE 410 such as International Mobile Subscriber Identity. The authentication procedure and target UE information transmission may be performed by the Home Subscriber Server (HSS) of the core network 420.

At operation 454, the ADMF 432 transmits the LI Activation Command including the device information of the target UE 410 to the EPC 420 or ProSe Function or directly to the UE to command interception to the target UE 410. At this time, the operation to be performed is determined depending on the network entity receiving the LI Activation Command and system architecture. For example, if the Mobility Management Entity (MME) receives the message for LI activation, the MME may operate differently depending on the presence/absence of the D2D capability of the UE based on the received UE ID. The UE may register a capability thereof with the MME in an initial attach procedure. If the UE has D2D capability and operates in the D2D communication mode currently, the MME prepares for D2D LI Enable operation. The MME may acquire the ID for D2D communication through communication with the ProSe function if necessary.

If the UE has D2D capability and is not in D2D communication mode, then the MME may instruct the UE to prepare for D2D LI Enable operation depending on the embodiment. The D2D LI Enable operation may be interchangeably referred to as D2D LI Activation operation.

If the UE does not have D2D capability, then the MME may command to set IP packets with LI Enable through communication with the PGW as in the legacy procedure. In another example, the MME reports the absence of D2D capability in reply, and the ADMF 432 commands the PGW to perform LI Activation as in the legacy procedure.

In another example, if the ProSe receives the LI Activation Message, then the ProSe prepares for LI based on the ProSe ID of the UE which the ProSe has retained. The ProSe function prepares for 3GPP ID for communication with MME if necessary.

The process made up of operations 451 to 454 described above may be defined as 'common process of LI activation.' Although the description is directed to the LI procedure in LTE, the detailed operations of the LI procedure may vary depending on the system configuration.

Meanwhile, at operation 461, the target UE 410 enables or activates the LI operation. The LI activation may be triggered according to a policy which the target UE 410 has downloaded from the LEA or the country or the operator or has been retained already. For example, the LI-related policy may be embedded in the target UE 410 when the user subscribes with the operator or downloaded through Over the Air (OTA).

According to various embodiments of the present disclosure, the LI operation may be activated under the conditions included in the LI Activation command message received from the LEA. The LI activation command may include LI configuration information such as interception range and interception time. The target UE 410 activated the LI operation as described above operates in the LI Enable state. The LI Activation Command may be transmitted in a different way or via other network entity depending on the system architecture.

In the system architecture of FIG. 2A, if an activation command is received from the ADMF 432, then the MME send the target UE 410 an LI activation command message through the NAS interface using the target UE ID. In another example, if ADMF activation is received from the ADMF 432, then the MME sends the eNB the LI activation command message through S1 interface, and the eNB sends the target UE 401 this message (e.g., the LI activation command message) through RRC. In another example, if the activation command is received from the ADMF 432, then the MME sends the ProSe function 240 the LI Activation Command through the PC4 interface, and the ProSe Function 240 sends the target UE 410 the LI Activation Command message through the PC5 interface using the target UE ID.

In the system architecture of FIG. 2B, if the LI command is received from the ADMF 432, then the ProSe function 240 sends the UE the LI Activation Command message through the PC3 interface using the target UE ID.

At operation 462, the target UE 410 may be out of coverage.

At operation 463, Tx/Rx information on the direct link is stored. For example, the target UE 410 may store the Tx/Rx information relating to the direct link.

At operation 464, the UE may return to coverage.

According to various embodiments of the present disclosure, at operation 465, the ADMF 432 may send the target UE 410 the LI Activation command directly through an IP connection.

In LI Enable state, the target UE 410 stores the Tx and/or Rx information occurring in the D2D communication session in the storage device. For example, at operation 463, the target UE 410 may store the Tx and/or Rx information occurring in the D2D communication session in the storage device. At this time, the content to be stored may be preconfigured in LI Enable process or determined according to a command. The storage device may include an internal memory of the target UE 410 and an external storage device. The storage device storing the D2D communication information is protected against any access and any attempt to modify the stored information.

According to the first embodiment of the present disclosure for the target to store the information occurring in the D2D communication session, if the target UE 410 has the policy of LEA, country, or operator already for use in activating the LI operation, the target UE 410 stores TX and/or Rx information occurring in the communication session between the UEs in the storage device regardless of the target UE 410 location (e.g., the network coverage (In Coverage) or coverage hole (Out of Coverage)).

If the target UE 410 activates LI based on the LI Activation Command message received from the ADMF 432, EPC entity, or ProSe Function 240, then the LI operation is performed differently depending on the location of the target UE 410.

According to various embodiments of the present disclosure, if the target UE 410 is in the coverage area, then target UE 410 stores the Tx and/or Rx information based on the configuration information included in the LI Activation Command. According to various embodiments of the present disclosure, if the target UE 410 is out of the coverage area, then target UE 410 performs other operations depending on the LI Enable condition as follows. If the target UE 410 is LI-enabled based on the LI Activation Command message received from the ADMF 432, EPC entity, or ProSe Function 240 in the in-coverage state, then target UE 410 stores the Tx and/or Rx information according to the configuration of the LI Activation Command Message in the out-of-coverage state. Otherwise, if the target UE 410 does not receive the LI Activation Command Message from the AMDF 432, EPC entity, or ProSe Function 240, then target UE 410 does not store any Tx and/or Rx information. The Tx/Rx information may include the IRI and CC.

Whether the target UE 410 is in the coverage area may be determined through various methods such as RLF declaration of 3GPP LTE or in compliance with the policy of the system serving the UE.

Afterward, at operation 466, the target UE 410 sends the delivery function 431 of the LEA an LI report including the D2D communication information stored in the storage device. At this time, the transmission path of the LI report message to the delivery function 431 may be determined differently depending on the system architecture. This is more clarified in the following LI report procedure. Basically, the LI report message is transmitted through an IP network (over the IP) but the interface (e.g., NAS) may be changed depending on message size or other condition. At operation 467, the LEMF 433 receives the LI report from the target UE 410 via the delivery function 310. The LEMF 433 may end the LI procedure.

Descriptions are made of the LI report methods of the target UE 410 according to various embodiments of the present disclosure.

First, the target UE 410 may perform the LI report in compliance with the LEA, country, operator policy, and/or the like downloaded or already retained. For example, when the target UE 410 located out of the coverage area returns to the coverage (in coverage) at operation 464, the target UE 410 may report the stored D2D communication information immediately. For example, in response to a target UE 410, which is located out of coverage, returning to the coverage (e.g., so as to be in coverage), the target 410 may report the stored D2D communication information. In another example, the target UE 410 may perform RI report when (e.g., in response to) the stored D2D communication information amount is equal to or greater than a predetermined amount. In addition, the RI report may be performed periodically.

Second, the target UE 410 enables the LI function in compliance with the conditions included in the LI Report command message transmitted by the EPC 420. According to various embodiments of the present disclosure, the EPC 420 may configure the LI report operation differently depending on the communication capability of the target UE 410. If the target UE 410 does not have D2D capability, then the EPC 420 performs the LI according to the legacy LI method as described with reference to FIG. 2. Otherwise if the target UE 410 is operating in the D2D communication mode or has the D2D capability, then the EPC 420 transmits the LI Report Command message to command the target UE 410 to report D2D communication information. The LI Report Command message may be transmitted in one of the at least four ways depending on the system architecture.

First, the ADMF 432 may send the target UE 410 the LI Report Command message directly through IP connection or OTA.

Second, the ADMF 432 sends the MME as an EPC entity the LI Report Command message and then the MME sends the target UE 410 the LI Report Command message through NAS directly or RRC via eNB.

Third, the MME sends the target UE 410 the LI Report Command message via the ProSe Function 240.

Fourth, the ADMF 432 sends the ProSe function 240 the LI Report Command message and then the ProSe Function sends the target UE 410 the LI Report Command Message via a PC.

The target UE 410 may report the information accumulated in the storage unit in response to the LI Report Command message. The LI Activation Command message may include interception condition (interception time and interception request information) for the EPC 420 to determine whether the LI Report Command is valid. The LI Activation Command message also may include the destination address of the Report. The target UE 410 may transmit the LI Report to the destination address.

A description is made of the RI report procedure hereinafter. The target UE 410 may report the Tx/Rx discovery information and communication information of the target UE through the LI report.

In the case of reporting the received communication information, the communication information includes Layer 2 ID, Layer 3 ID, or group ID of the receiver UE. The ID of the sender UE can be acquired from the packet transmitted by the sender UE, and the ID of the receiver UE is replaced by its own ID.

In the case of reporting the communication information to be transmitted, the communication information includes Layer 2 ID, Layer 3 ID, or group ID of the receiver UE. The ID information of the receiver UE is generated by application, Layer 2, or Layer 3 (e.g., inside the UE). The ID of the sender UE may be included in the communication information if necessary.

According to various embodiments of the present disclosure, the ID included in the communication information may be the ID allocated for D2D communication. The UE (e.g., the target UE 410) may transmit the report including the ID and IRI and CC depending on the system architecture. As an example, the ADMF 432 triggers the LI report of the UE (e.g., the target UE 410) directly, the LI Report Command message includes the address of the delivery function 431 of the LEA as the destination address. Accordingly, the UE (e.g., the target UE 410) transmits the LI Report to the delivery function 431 directly through IP communication.

As another example, the MME of the EPC triggers the LI Report, the LI Report Command message include the address of the delivery function 431 of the LEA or the address of the PGW as the destination address. If the destination is the PGW, the ADMF 432 has sent the PGW the LI Activation command and the PGW has acquired the address of the delivery function 431 in the Activation process already, the D2D Report can be forwarded to the delivery function 431. In the case that the PGW is the destination, the bearer for LI report may be established with the PGW.

As another example, the ProSe function 240 triggers the LI report, the address of the Prose Function is included as the target address and, if the ProSe function 240 receives the Report information from the target UE 410, then the report is forwarded to the delivery function 431. For example, in response to receipt of the Report information from the target UE 410, the ProSe function 240 forwards the report to the delivery function 431. If the report arrives at the delivery function 431, then the delivery function 431 sends the LEMF 433 the IRI and CC. For example, in response to the delivery function 431 receiving the report, the delivery function sends the IRI and CC to the LEMF 433. The delivery function 431 may parse the report for the IRI and CC.

The ADMF 432 may have the subscriber information or acquire the subscriber information from the communication information reported by the target UE 410. For example, the ADMF 432 may acquire the subscriber information using the ID included in the communication information.

In order to acquire the ID from the subscriber information, the delivery function 431 sends a Subscriber Matching Request message to the EPC 420 or the ProSe function 240. If the EPC 420 receives the Subscriber Matching Request message, the EPC 420 sends the ProSe Function 240 a message requesting for the ID information. If the ProSe Function 240 receives the message, then the Prose Function 240 requests the EPC 420 for the Subscriber information (e.g., IMSI) using a 3GPP ID (S-TMSI) mapped to the ID information. Afterward, the EPC 420 acquires the subscriber information provided by the HSS if necessary. The EPC 420 or the ProSe Function 240 sends the Delivery Function 431 a Subscriber Matching Response message including the subscriber information, and the Delivery Function 431 sends the LEMF 433 the subscriber information and IRI and CC.

The discovery information may be configured differently depending on the embodiment. For example, the discovery code as a part of the discovery information may be generated by the ProSe Function 240. The uniqueness of the location and time of the discovery code depends on the ProSe Function. In another example, the discovery code may be generated in compliance with a rule of an application in advance. Because the discovery signal is broadcast rather than unicast to a specific recipient, the discovery information does not include any ID for use in expressly identifying the UE.

Accordingly, the discovery information reported by the UE (e.g., the target UE 410) is configured according to the method proposed in the present disclosure. If the target UE 410 reports the discovery information to report, then the target UE 410 includes a D2D ID thereof and discovery code in the report. For the received discovery information, the target UE 410 includes the D2D ID of the sender which decrypted based on a D2D ID or APP ID thereof and the discovery code in the report.

The LI Report message generated in this way is transmitted to the delivery function in various ways depending on the system architecture. If the ADMF 432 triggers the LI report directly, the LI Report Command message includes the address of the delivery function 431 of the LEA as the destination address. The UE (e.g., the target UE 410) transmits the Report to the delivery function 431 directly through IP communication.

According to various embodiments of the present disclosure, the MME of the EPC triggers the LI report, the LI Report Command message includes the address of the delivery function 431 of the LEA or the address of the PGW as the destination address. At this time, if the PGW address is the destination, then this means that the ADMF 432 has already sent the PGW the LI activation command and the PGW has acquired the address of the delivery function 432 or established the bearer for the report to the PGW already in the activation process, forwarding the D2D report to the delivery function 431 is possible. In both the cases, if the report information arrives at the delivery function 431, the discovery code information can be decrypted through operations according to various embodiments of the present disclosure. In an example, if the delivery function 431 sends the ProSe function 240 the Tx and Rx D2D ID information and discovery code, the ProSe function 240 sends the delivery function 431 the discovery-related information using its discovery code mapping table. In another example, the delivery function 431 may request the app server 250 for the application ID included in the report to acquire the discovery information.

According to various embodiments of the present disclosure, the ProSe function 240 triggers the Li report, the LI Report Command message includes the address of the ProSe 240 as the destination information and, if a report is received from the target UE 410, then the ProSe function 240 sends the delivery function 431 the discovery-related information using the discovery code mapping table or, if necessary, sends the delivery function 431 the information received from the ProSe App server through the PC2 interface.

In the case that the ADMF 432 has no subscriber information, when the report arrives at the delivery function 431, then the ADMF 432 may perform the operation for acquiring the subscriber information using the ID included in the report in various ways as proposed in the present disclosure. In an example, if the delivery function 431 sends the ProSe Function 240 the Tx and Rx information, then the ProSe function 240 sends the EPC 420 the EPC ID (S-TMSI) of the UE (e.g., the target UE 410) using an ID mapping table thereof (e.g., the ID mapping table 240 of the ProSe function 240) such that the EPC 420 acquire the Tx and Rx subscriber information and sends the subscriber information to the delivery function 431. In another example, if the delivery function 431 sends the EPC 420 the Tx and Rx information, then the EPC 420 queries the ProSe function 240 about the information. The ProSe function 240 sends the EPC the EPC ID (S-TMSI) of the UE using the ID mapping table, the EPC 420 acquires the Tx and Rx subscriber information and sends the delivery function 431 the subscriber information. According to various embodiments of the present disclosure, if the EPC 420 has the mapping table in both the examples, then the response process may be performed inversely.

Another method for delivering the LI report message to the delivery function 431 is that the application layer of the UE transmits the Tx and Rx information directly. In another example, if the delivery function ID included in the LI report message is the application ID, the delivery function 431 queries the app server 250 about the subscriber information.

Figure 5:
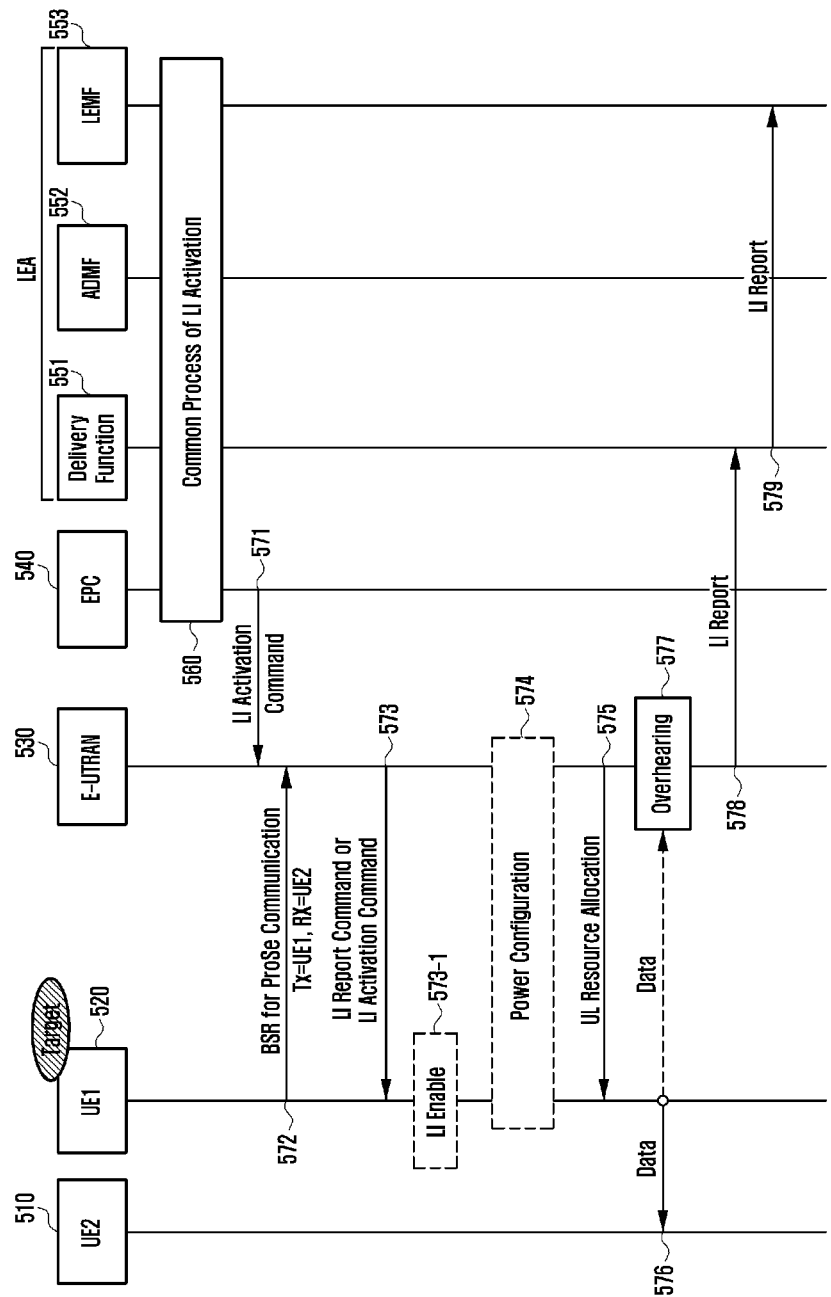
FIG. 5 is a signal flow diagram illustrating a lawful interception procedure according to the second embodiment of the present disclosure.

FIG. 5 is a signal flow diagram illustrating a lawful interception procedure according to the second embodiment of the present disclosure.

Referring to FIG. 5, at operation 560, the EPC 540 and the LEA perform the LI process. The LI process may include operations 451 to 454 of FIG. 4. The LEA may include a delivery function 551, an ADMF 552, and an LEMF 553.

At operation 571, the EPC 540 sends the E-UTRAN 530 the LI Activation Command to trigger LI to the target UE 520. The LI Activation command may include the LI conditions (interception time, interception request information, and/or the like). The E-UTRAN 530 may perform the LI to the target UE 520 during the valid period indicated in the LI activation Command.

If the target UE 520 sends the E-UTRAN 530 a Buffer Status Report (BSR) to request for the radio resource for D2D communication with a peer UE 510 at operation 572, then the LI of the E-UTRAN 530 is triggered. At operation 573, the E-UTRAN 530 sends the target UE 520 a LI Report Command in response to the BSR. For example, in response to receipt of a BSR from the target 520, the LI of the E-UTRAN 530 is triggered. In response to the LI of the E-UTRAN 530 being triggered, the E-UTRAN may send a LI Report Command or LI Activation Command to the target UE 520.

The LI Report Command transmitted by the E-UTRAN 530 includes a command for adjusting the power of the target UE 520 in order for the E-UTRAN 530 to eavesdrop the D2D communication content. The power adjustment of the target UE 520 may be performed in such a way of adjusting the physical power level to the extent that the signal reaches the E-UTRAN 530 or inserting a predetermined range class such as 'short' and 'long' into the command. The LI report command also includes the command for blocking the UE's operation state to transition to the idle state during the LI. For example, the LI target UE in D2D communication mode always stays in the connected state.

At operation 574, target UE 520 performs power configuration to adjust the transmission range according to the LI report command. According to various embodiments of the present disclosure, the target UE 520 may send the E-UTRAN 530 a power configuration response at the adjusted transmission power level. According to various embodiments of the present disclosure, the power configuration response may be omitted.

At operation 575, the E-UTRAN 530 allocates transmission resource to the target UE 520. For example, the E-UTRAN 530 my allocate uplink resources to the target UE 520. At operation 576, the target UE 520 sends the peer UE 510 the data at the power level configured as instructed by the E-UTRAN 530. At operation 577, the E-UTRAN 530 overhears the data transmitted by the target UE 520.

Meanwhile, the E-UTRAN 530 may intercept the discovery-related information in the similar way to intercepting data. If the LI Activation Command is received from the EPC 540, the E-UTRAN 530 sends the UE 520 the LI report command including the power configuration command. Afterward, the target UE 520 transmits the discovery information at the power level designated or allocated for a predetermined period, and the E-UTRAN 530 acquires the discovery-related information during the corresponding period.

After overhearing the IRI and CC associated with the target UE 520, at operation 578, the E-UTRAN 530 sends the delivery function 551 of the LEA the LI report including the intercepted information. The LI report is transmitted in the PDCP level data packet encapsulating the LEA IP using the function of the E-UTRAN 530 proposed in the present disclosure. Finally, at operation 579, the LEMF 553 receives the LI report via the delivery function.

In the case that the ADMF 432 has no subscriber information, when the LI report information arrives at the delivery function 551, the ADMF 552 performs the operation to acquire the subscriber information based on the ID included in the report in various ways proposed according to various embodiments of the present disclosure. In the first example, the delivery function 551 sends the ProSe Function 240 the Tx and Rx information, and the ProSe function 240 sends the EPC 540 the EPC ID (S-TMSI) of the UE (e.g., the target UE 520) using an ID Mapping Table thereof, and the EPC 540 sends the delivery function 551 the subscriber information acquired based on the Tx and Rx information. In the second example, the delivery function 551 sends the EPC 540 the Tx and Rx information, and the EPC 540 queries the ProSe function 240 about the information. The ProSe Function 240 sends the EPC 540 the EPC ID (S-TMSI) of the UE (e.g., the target UE 520) using a ID Mapping Table thereof, and the EPC 540 sends the delivery function 551 the subscriber information acquired based on the TX and Rx information. According to various embodiments of the present disclosure, if the EPC 540 has the mapping table in both the examples, then the response process is performed inversely. According to various embodiments of the present disclosure, the target UE 520 may further perform operation 573-1 as illustrated in FIG. 5. At operation 573-1, target UE 520 enables the LI function. The LI activation may be triggered according to the LI policy downloaded from the LEA, the country, or the operator or retained in the target UE 520 already. In another example, the LI function is enabled in compliance with the conditions included in the LI Activation Command message received from the LEA. The LI Activation Command includes the LI-related configuration information such as interception range and interception time. After activating the LI function, the target UE 520 enters the LI Enable state.

The E-UTRAN 530 sends the target UE 520 the LI Activation Command at operation 573, and the target UE 520 performs operation 573-1 upon receipt of the LI Activation command. In the LI Enable state, the target UE 520 may perform operation 574.

Figure 6:
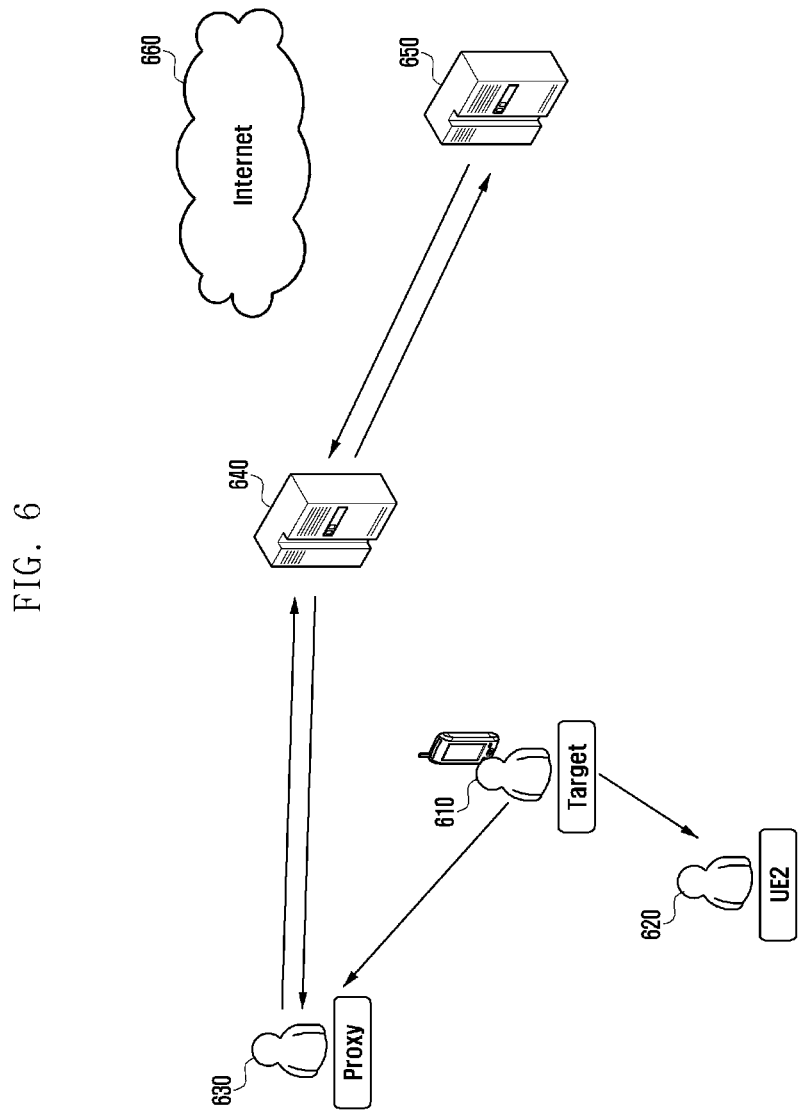
FIG. 6 is a diagram illustrating an overview of a LI procedure according to third and fourth embodiments of the present disclosure.

FIG. 6 is a diagram illustrating an overview of an LI procedure according to third and fourth embodiments of the present disclosure.

Referring to FIG. 6, the information exchanged in D2D communication between the target UE 610 and the peer UE 620 is transferred to a proxy UE 630 responsible for LI, and the proxy UE 630 sends an LI report to the LEA 650 through (e.g., using) the network 640. The proxy 630 may send the LI report to the LEA 650 using the internet 660. The proxy UE 630 may be the UE fabricated for special purposes for use in firehouse or police station responsible for public security.

Figure 7:
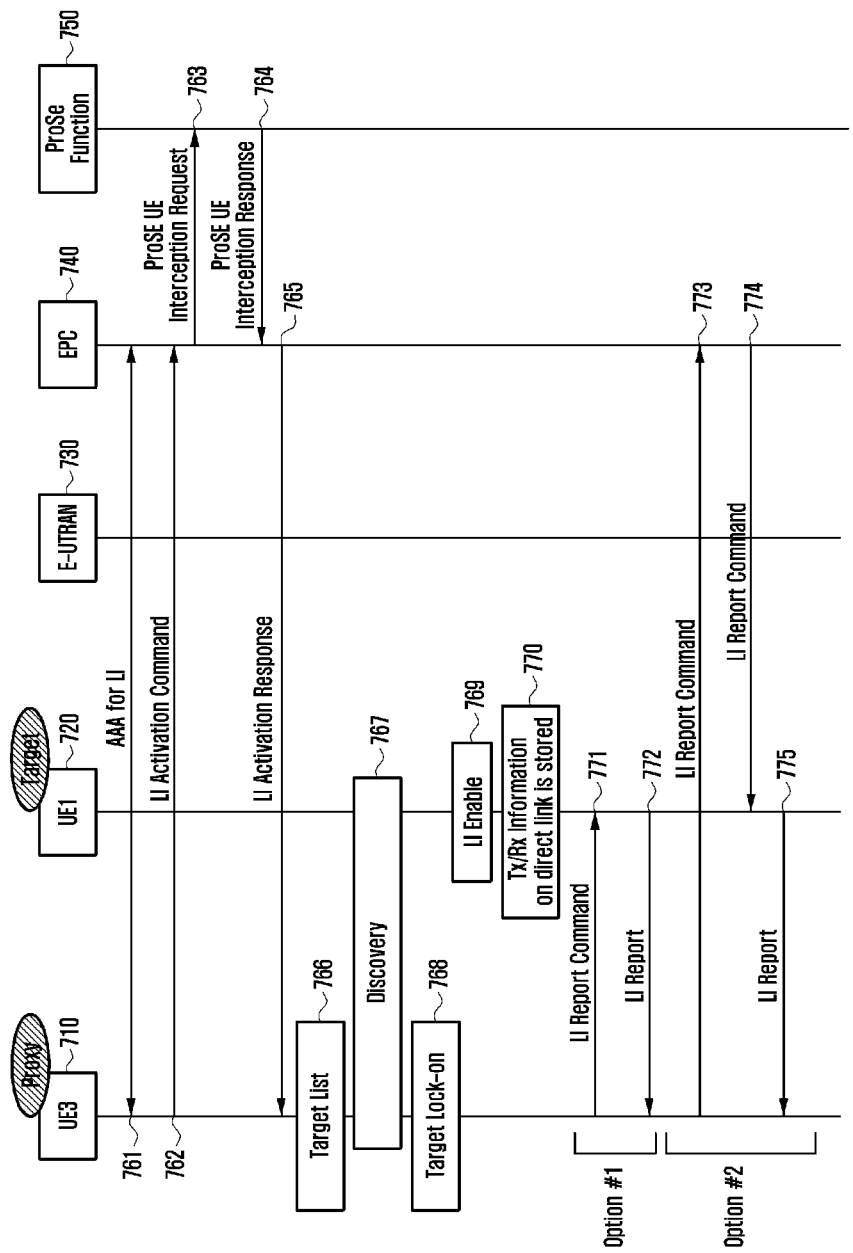
FIG. 7 is a signal flow diagram illustrating a LI procedure of a proxy User Equipment (UE) according to the third embodiment of the present disclosure.

FIG. 7 is a signal flow diagram illustrating a LI procedure of the proxy UE according to the third embodiment of the present disclosure.

Referring to FIG. 7, at operation 761, a proxy UE 710 performs authentication process with the EPC 740 for LI and requests the EPC 740 for the device information of the target UE 720 (e.g., IMSI) to discover the target UE 720. The HSS of the EPC 740 may be responsible for authentication of the proxy UE 710 and provision of the target UE information.

The proxy UE 710 receives the information on the target UE 720 (e.g., the corresponding target UE information) and transmits the LI Activation Command including the information on the target UE 720 to the EPC 740 or ProSe Function 750 to request for the information for use in LI to the target UE 720. For example, at operation 762, the proxy UE 710 transmits an LI Activation Command to the EPC 740.

After receiving the LI Activation Command from the proxy UE 710, at operation 763, the EPC 740 sends the ProSe Function 750 a ProSe UE Interception Request to provide the discovery-related information necessary for checking (e.g., determining) the proximity of the target UE 720. Thereafter, at operation 764, the ProSe Function 750 sends the EPC 740 the ProSe UE Interception Response including the requested information. Upon reception of the discovery-related information, at operation 765, the EPC 740 sends, to the proxy UE 710, the LI Activation Response including the discovery-related information.

According to various embodiments of the present disclosure, upon receipt of the LI Activation Command from the Proxy UE 710, the ProSe Function 750 sends the LI Activation Response including the discovery-related information necessary for checking (e.g., determining) the proximity of the target UE 720.

At operation 766, the proxy UE 710 generates a target list including the information which the current target UE 720 uses for discovery (e.g., target code).

Thereafter, at operation 767, the proxy UE 710 joins the discovery process and checks (e.g., determines) the proximity of the target UE 710 by referencing the target list. At operation 768, if the discovery is performed successfully such that the proximity is checked (e.g., determined), then the proxy UE 710 locks on the target UE.

At operation 769, the target UE 720 enables the LI function according to the above-described method. At operation 720, the target UE 720 stores the Tx/Rx information of the D2D communication. The proxy UE 710 may acquire the D2D communication information stored by the target UE 720.

According to various embodiments of the present disclosure, at operation 771, the proxy UE 710 sends the target UE 720 a LI Report Command. At operation 772, the proxy UE 710 receives an LI Report including the D2D communication information at operation 772.

According to various embodiments of the present disclosure, at operation 773, the proxy UE 710 sends the EPC 740 or the ProSe function 750 the LI Report Command. At operation 774, the EPC 740 forwards the LI Report Command to the target UE 720. At operation 775, the target UE 720 sends the proxy UE 710 the LI Report including the D2D communication information according to the proxy UE information included in the LI Report Command.

Figure 8:
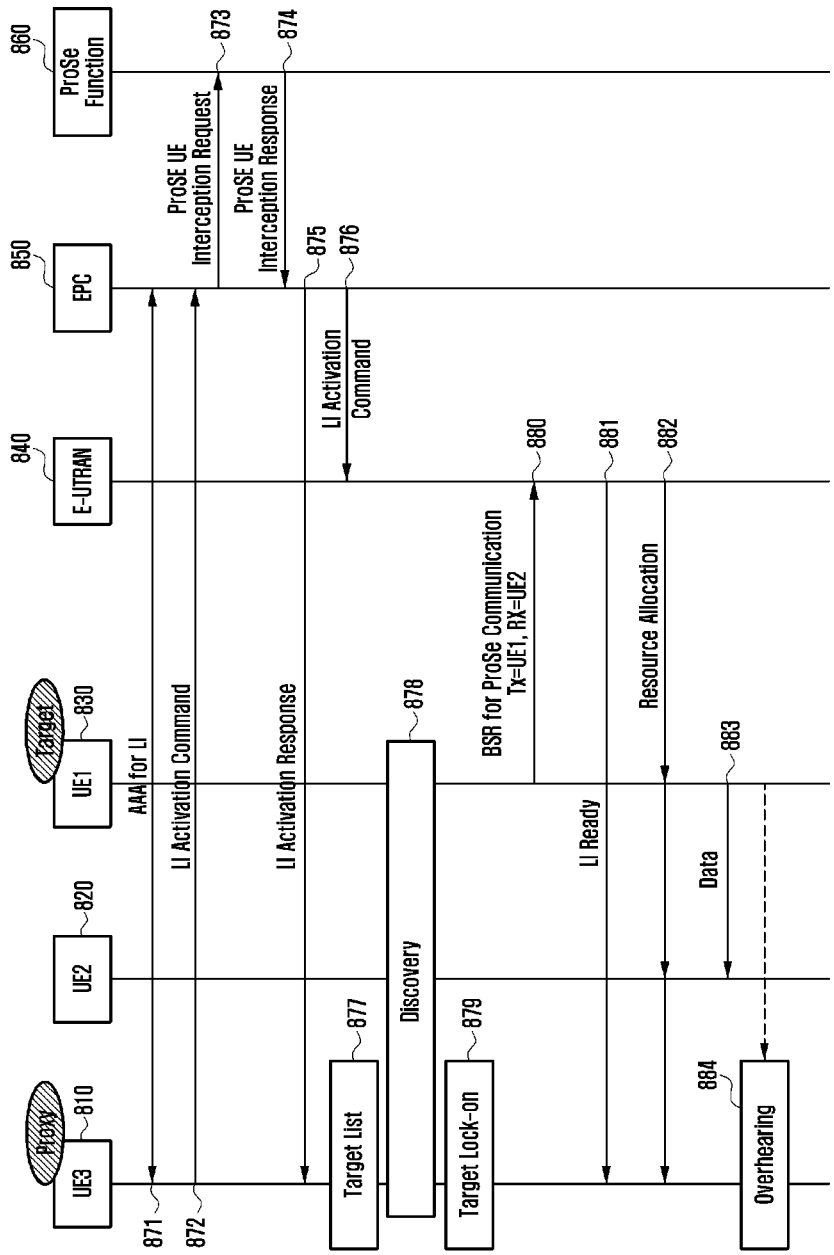
FIG. 8 is a signal flow diagram illustrating an LI procedure of a proxy UE according to the fourth embodiment of the present disclosure.

FIG. 8 is a signal flow diagram illustrating an LI procedure of a proxy UE according to the fourth embodiment of the present disclosure.

Referring to FIG. 8, at operation 871, the proxy UE 810 performs authentication process to the EPC 850 for LI and requests for the target UE information (e.g., IMSI) to perform the process of discovering the target UE 830. The HSS of the EPC 850 may be responsible for the proxy UE authentication and target UE information transfer.

After receiving the information on the target UE 830, at operation 872, the proxy UE 810 sends the EPC 850 the LI Activation Command including the information on the target UE 830 to request the information for LI to the target UE 830. According to various embodiments of the present disclosure, the corresponding entity of the EPC 850 may be changed depending on the network configuration.

After receiving the LI Activation Command from the proxy UE 810, at operation 873, the EPC 850 sends the ProSe Function 860 a ProSe UE Interception Request including the discovery-related information used by the target UE 830 to transfer the discovery-related information necessary for checking (e.g., determining) the proximity of the target UE 830. At operation 874, upon receipt of the ProSe UE Interception Request, the ProSe Function 860 sends the EPC 850 a ProSe UE Interception Response including the requested information.

If the discovery-related information is acquired, then at operation 875, the EPC 850 sends the proxy UE 810 a LI Activation Response including the discovery-related information. At operation 877, the proxy UE 810 generates a target list including the information used by the currently target UE 830 for discovery (e.g., target code).

According to various embodiments of the present disclosure, at operation 872, upon receipt of the information on the target UE 830, the proxy UE 810 sends the ProSe Function 860 the LI Activation Command including the information on the target UE 830 to request for the information for LI to the target UE 830.

Upon receipt of the LI Activation Command from the proxy UE 810, the ProSe function 860 sends the proxy UE 810 the LI Activation Response including the discovery-related information necessary for checking (e.g., determining) the proximity of the target UE 830. At operation 877, the proxy UE 810 generates the target list with the information used by the current target UE 830 (e.g., target code).

Next, at operation 878, the proxy UE 810 joins the discovery process and checks (e.g., determines) the proximity of the target UE 830 by referencing the target list. If the discovery is performed successfully and thus the proximity is checked (e.g., determined), then at operation 879, the proxy UE 810 locks on the target UE 830.

Meanwhile, at operation 876, the entity of EPC 850 or ProSe function that has received the LI Activation command sends the E-UTRAN 840 the LI Activation command to perform LI to the target UE 830. Upon receipt of the LI Activation Command, the E-UTRAN 840 performs LI to the target UE 830 during the valid period indicated in the LI Activation Command message. At operation 880, the target UE 830 sends the E-UTRAN 880 a Buffer Status Report (BSR) to request for the radio resource for D2D communication with a peer UE 820. At operation 881, the E-UTRAN 840 sends the proxy UE 810 a LI Ready message in order for the target UE 830 to prepare for LI. For example, the target UE 830 sends the E-UTRAN 840 a Radio Resource Request (RRR) for data transmission during the valid period of the message, then at operation 881, the LI is triggered such that the E-UTRAN 840 sends the proxy UE 810 a LI Ready message in order for the target UE 830 to prepare for LI. The proxy UE 810 may acquire intra-cell resource information of the target UE 830 and security key of radio communication through the LI Ready message.

Afterward, at operation 882, the E-UTRAN 840 allocates radio resource to the target UE 830 and the proxy UE 810. If the target UE 830 transmits data to the peer UE 820 through D2D communication at operation 883, then at operation 884, the proxy UE 810 overhears the data (or a portion thereof) communicated between the peer UE 820 and the target UE 830 during the resource period.

Figure 9:
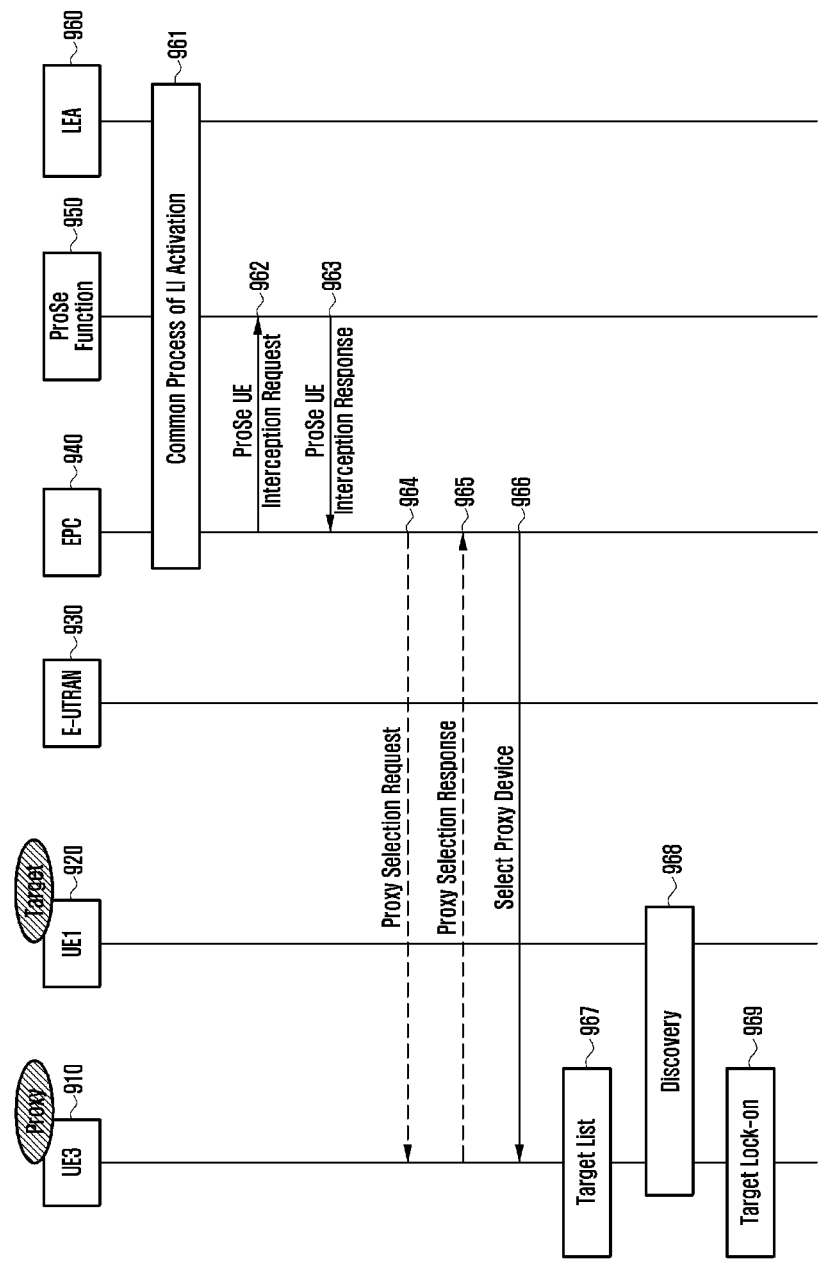
FIG. 9 is a signal flow diagram illustrating a proxy UE selection procedure according to an embodiment of the present disclosure.

FIG. 9 is a signal flow diagram illustrating a proxy UE selection procedure according to an embodiment of the present disclosure.

Referring to FIG. 9, at operation 961, the EPC 940 and the LEA 960 perform LI Activation process. The LI Activation process of operation 961 may include operations 451 to 454 of FIG. 4. Through the LI activation process, the LEA 960 acquires the information on the target UE 920 (e.g., IMSI) from the EPC 940 to discover a suitable proxy UE 910 around (e.g., in proximity to or within a threshold distance to) the target UE 920. In the LI Activation process, the HSS of the EPC 940 may be responsible for authentication and target UE information transfer.

If an entity (MME) of the EPC 940 receives the LI Activation message from the ADMF 261 (e.g., of the LEA 960), then at operation 962, the EPC 940 sends the ProSe Function 950 a ProSe UE Interception Request to acquire the information related to the inter-UE discovery of the target UE and communication. At operation 963, the ProSe Function 950 sends the EPC 940 a ProSe UE Interception Response message including inter-UE discovery-related information such as discovery code registered by the target UE 920 and D2D communication-related information. The EPC 940 may select one or more appropriate proxy UEs 910 based on the received information.

According to various embodiments of the present disclosure, if the ProSe Function 950 receives the LI Activation message from the ADMF 261, then the ProSe Function 950 prepares for the information related to the inter-UE discover and communication of the target UE 920 which has been stored previously. The ProSe Function 950 may select one or more appropriate proxy UEs 910 based on the received information.

According to various embodiments of the present disclosure, at operation 966, the EPC 940 or the ProSe Function 950 may send the selected proxy UE 910 a Proxy UE selection (Select Proxy Device) message directly. According to various embodiments of the present disclosure, at operation 964, the EPC 940 sends a Proxy Selection Request message to the MME or available candidate UEs within the cell and at operation 965, receives a Proxy Selection Response message from the proxy UE 910 to select the proxy UE 910.

If the discovery-related information is received from the EPC 940 or the ProSe Function 950, then at operation 967, the proxy UE 910 generates the target list with the information such as discovery code used by the target UE 920 for discovery. Thereafter, at operation 968, the proxy UE 910 joins the discovery process to check (e.g., determine) the proximity of the target UE 920 based on the target list. If the discovery is performed successfully and thus the proximity is checked (e.g., determined), then at operation 969, the proxy UE 910 locks on (or otherwise listens to communication with) the target UE 920.

Because the LI process of the proxy UE 910 after the lock-on of the target UE 920 is identical with the process of operations 769 to 775 of FIG. 7 or operations 880 to 884 of FIG. 8, detailed description thereon is omitted herein.

Figure 10:
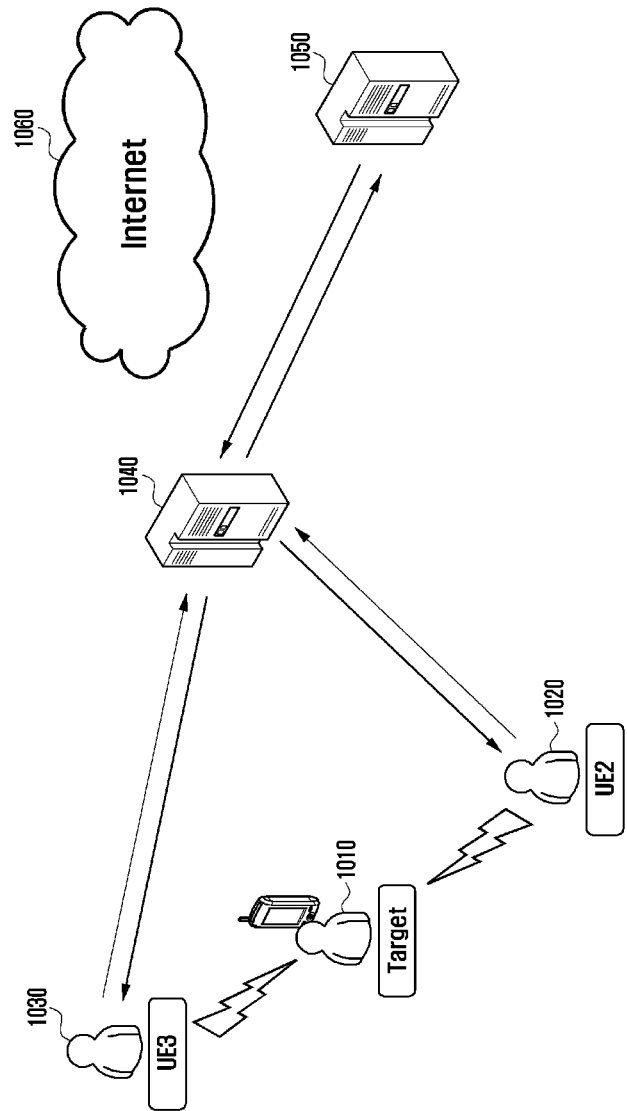
FIG. 10 is a diagram illustrating an overview of an LI procedure according to a fifth embodiment of the present disclosure.

FIG. 10 is a diagram illustrating an overview of an LI procedure according to a fifth embodiment of the present disclosure.

Referring to FIG. 10, if the LEA 1050 requests for LI to the target UE 1010, the network 1040 sends the identity information of the target UE 1010 and registered discovery code to the ProSe UEs 1020 and 1030 within a predetermined area centered around the target UE 1010. The ProSe UEs 1020 and 1030 may notify the network 1040 of the un-registered discovery code, if found, as well as the registered discovery code transmitted by the target UE 1010. Detailed description is made thereof hereinafter. The network 1040 may communicate with the LEA 1050 using the interne 1060.

Figure 11:
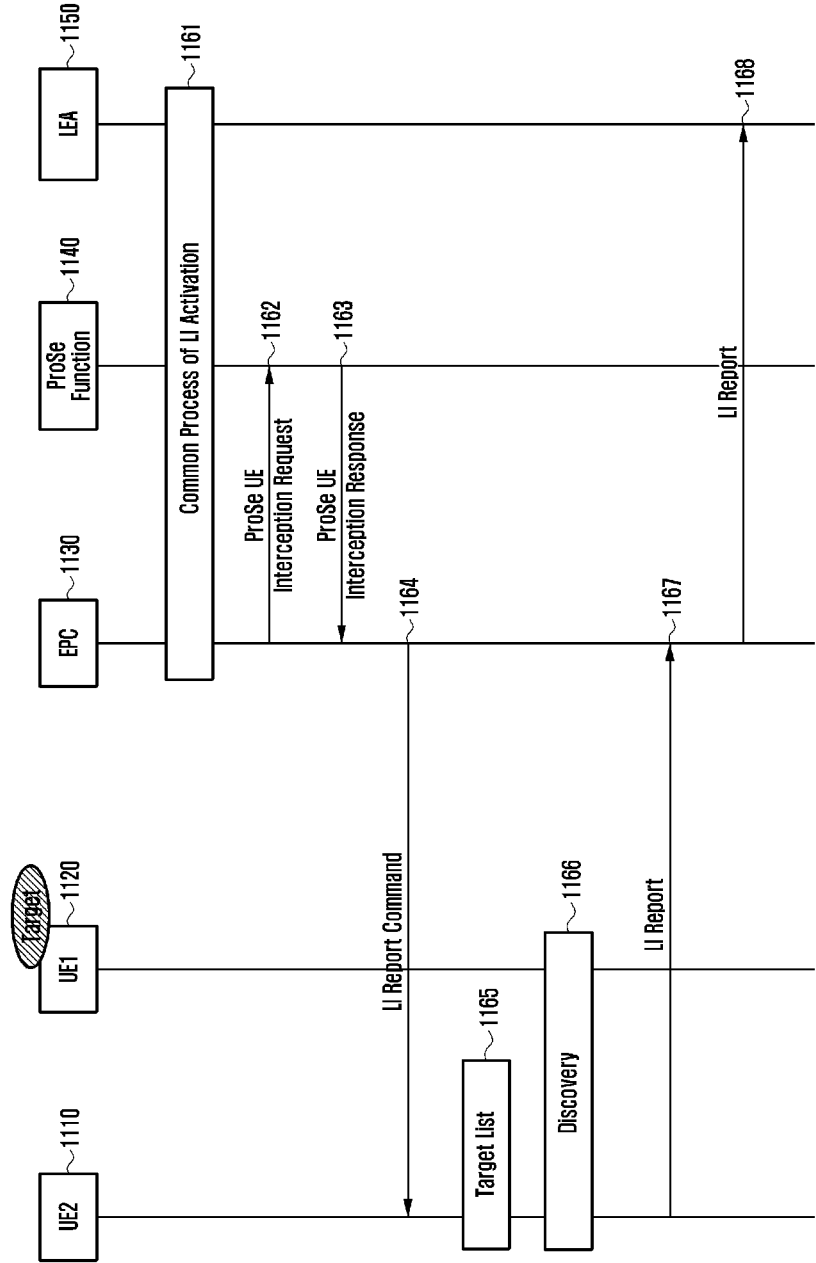
FIG. 11 is a signal flow diagram illustrating an LI procedure according to the fifth embodiment of the present disclosure.

FIG. 11 is a signal flow diagram illustrating an LI procedure according to the fifth embodiment of the present disclosure.

Referring to FIG. 11, the communication system includes a target UE 1120 and an LI UE 1110 performing LI to the target UE 1120. Both the target UE 1120 and the LI UE 1110 have the D2D communication capability.

At operation 1161, a common process of LI Activation at operation is performed. The common process of LI Activation may be performed differently depending on the system architecture. The ADMF 261 (e.g., of the LEA 1150) may send a LI Activation message to the EPC 1130 or the ProSe Function 1140.

At operation 1161, the EPC 1130 and the LEA 1150 may perform LI Activation process. The LI Activation process may include operations 451 to 454 of FIG. 4. Through the LI Activation process, the LEA 1150 acquires the information on the target UE 1120 (e.g., IMSI) from the EPC 1130 to discover a suitable LI UE 1110 around the target UE 1120. In the LI Activation process, the HSS of the EPC 1130 may be responsible for authentication and UE information provision.

If the entity (MME) of the EPC 1130 receives the LI Activation message from the ADMF 261, then at operation 1162, the EPC 1130 (e.g., the entity of the EPC 1130) sends the ProSe Function 1140 a ProSe UE Interception Request for acquiring inter-UE discovery and communication information of the target UE. At operation 1163, the ProSe Function 1140 sends the EPC 1130 a ProSe UE Interception Response including inter-UE discovery-related information such as the discovery code registered by the target UE 1120 and D2D communication-related information.

If the LI Activation message is received from the ADMF 261 (e.g., the LEA 1150), then the ProSe function 1140 prepares the information related to the inter-UE discovery and communication of the target UE 1120. On the basis of this information, the EPC 1130 or the ProSe Function 1130 may select one or more suitable LI UE 1110. According to various embodiments of the present disclosure, at operation 1163, the ProSe function 1140 may send the EPC 1130 the ProSe UE Interception Response including the inter-UE discovery-related information such as discovery code registered by the target UE 1120 and the D2D communication-related information.

At operation 1164, the EPC 1130 sends the selected LI UE 1110 a LI Report Command through NAS signaling. The EPC 1130 may select the LI UE 1110 based on the serving cell of the target UE 1120 or the Tracking Area (TA) of the target UE 1120.

According to various embodiments of the present disclosure, at operation 1164, the ProSe Function 1140 sends the selected UE 1110 the LI Report Command through PC3 interface. In this case, operation 1163 may be omitted. According to various embodiments of the present disclosure, the ProSe Function 1140 may select the LI UE 1110 based on the serving cell of the target UE 1120 or the TA of the target UE 1120.

At operation 1165, LI UE 1110 acquires the discovery-related information from the LI Report Command and generates a target list with the information such as discovery code used by the target UE 1120. Thereafter, at operation 1166, the LI UE 1110 joins the discovery process of the target UE 1120 to acquire IRI of the target UE 1120 by referencing the target list.

Afterward, at operation 1167, the LI UE 1110 performs LI report in compliance with the conditions configured in the LI Report Command or periodically or predetermined conditions.

The LI Report is transmitted to the Delivery Function 263 (e.g., of the LEA 1150) in various ways depending on the network architecture. In an example, the ADMF 261 (e.g., of the LEA 1150) triggers the LI report of the UE directly, and the UE (e.g., the LI UE 1110) sets the destination address of the LI Report Command to the address of the delivery function 263. Accordingly, the UE (e.g., the LI UE 1110) sends the Report information to the delivery function 263 through IP communication.

In another example, if the MME of the EPC 1130 triggers LI report, then the destination address of the LI Report Command is set to the address of the delivery function 263 of the LEA 1150 or the address of the PGW. At this time, because the ADMF 261 (e.g. of the LEA 1150) has sent the PGW the LI Activation Command and the PGW has acquired the address of the delivery function or established the dedicated LI Report bearer in the activation process, the LI Report may be forwarded to the delivery function 263 (e.g., of the LEA 115) through the dedicated bearer.

In both the above examples, if the LI Report is received, then the delivery function 263 (e.g., of the LEA 1150) performs the operation for decrypting the discovery code in various method proposed according to various embodiments of the present disclosure. In an example, if the delivery function 263 sends the ProSe Function 1140 the Tx and Rx D2D ID information and discovery code, then the ProSe Function 1140 sends the deliver function 263 (e.g., of the LEA 1150) the discovery-related information using the Discovery Code Mapping Table. In another example, the delivery function 260 (e.g., of the LEA 1150) may queries the App server 250 about the Application ID included the Report directly.

In another example, if the ProSe Function 1140 triggers LI report, the address of the ProSe Function 1140 is inserted as the destination address and, if the LI report is received from the target UE 1120 (or the LI UE 1110), then the ProSe Function 1140 sends the delivery function 263 the discovery-related information by referencing the Discovery Code Mapping Table or, if necessary, queries the ProSe App server about the information through a PC2 interface.

According to various embodiments of the present disclosure, at operation 1168, the LEA 1150 may receive the LI report form the delivery function 263.

Figure 12:
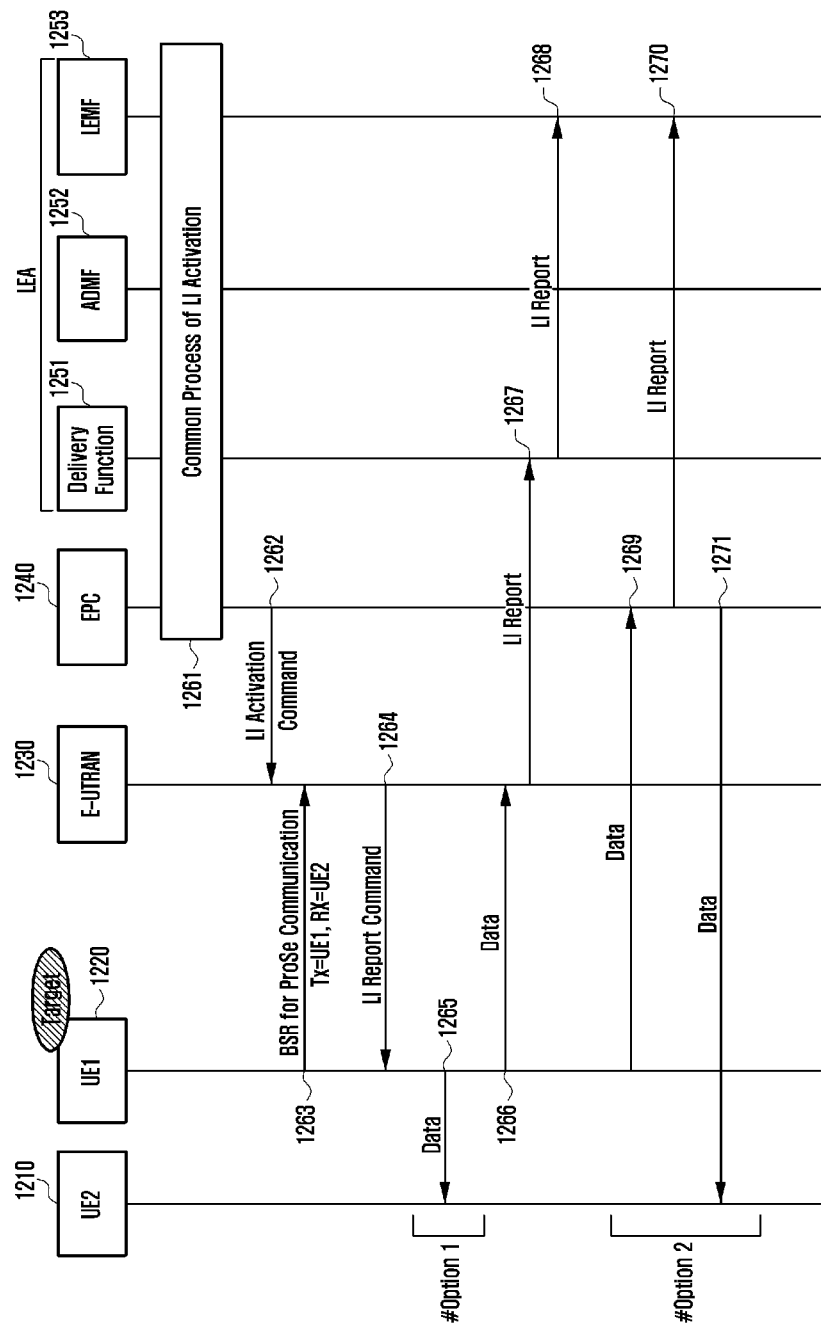
FIG. 12 is a signal flow diagram illustrating an LI procedure according to a sixth embodiment of the present disclosure.

FIG. 12 is a signal flow diagram illustrating an LI procedure according to a sixth embodiment of the present disclosure.

Referring to FIG. 12, in order to intercept the data exchanged in the D2D communication between the target UE 1220 and the peer UE 1210, at operation 1261, the EPC 1240 and the LEA perform a LI Activation process. The LI Activation operation of operation 1261 includes operations 451 to 454 of FIG. 4.

At operation 1262, the EPC 1240 sends the E-UTRAN 1230 a LI Activation Command to perform LI to the target UE 1220. The LI Activation Command may include LI conditions (e.g., LI time and LI request information). Upon receipt of the LI Activation Command, the E-UTRAN 1230 may perform LI to the target UE 1220 during the period indicated in the LI activation command.

At operation 1263, target UE 1220 sends the E-UTRAN 1230 a BSR to request for radio resource for D2D communication with the peer UE 1210 in the LI period indicated in the LI activation command.

If the target UE 1220 sends the E-UTRAN 1230 a BSR to request for radio resource for D2D communication with the peer UE 1210 in the LI period indicated in the LI activation command at operation 1263, then the LI of the E-UTRAN 1230 is triggered. In response to receipt of the BSR, at operation 1264, the E-UTRAN 1230 sends the target UE 1220 a LI Report Command.

The LI Report Command transmitted by the E-UTRAN includes a command for connecting to the D2D communication path between the target UE 1220 and the peer UE 1210 and the communication path between the target UE 1220 and the eNB simultaneously. If necessary, the target UE 1220 establishes a communication path with the EPC 1240 to transfer data. At this time, if there is any preconfigured data bearer in use, the above operation may be omitted.

Afterward, the E-UTRAN 1230 allocates resource to the target UE 1220. The resource allocation may be performed differently depending on the various embodiments of the present disclosure.

According to various embodiments of the present disclosure, the E-UTRAN 1230 allocates the resource for D2D communication and the resource for data transmission to the eNB simultaneously in order for the target UE 1220 to transmit data through both the two paths. In this case, at operations 1265 and 1266, the target UE 1220 transmits the D2D communication data to the peer UE 1210 through the D2D communication path and to the network simultaneously.

At operation 1267, the E-UTRAN 1230 encapsulates the IP address of the LEA and the PDCP level data packet received from the UE to generate the LI report to the delivery function 1251 of LEA. At operation 1268, LEMF 1253 of the LEA receives the LI Report from the delivery function 1251.

According to various embodiments of the present disclosure, if the MME of the EPC 1240 triggers LI report, the LI Report Command includes the address of the Delivery function 1251 of the LEA or the address of the PGW as the destination address. At this time, because the ADMF 1252 has sent the PGW the LI Activation Command and the PGW has acquired the address of the delivery function 1251 or established the dedicated LI Report bearer in the activation process, the E-UTRAN 1230 may forward the LI Report to the delivery function 1251 through the dedicated bearer.

The E-UTRAN 1230 may have the target UE 1220 transmit the D2D communication data to the EPC 1240. Accordingly, at operation 1269, the target UE 1220 sends the EPC 1240 the data, and at operation 1270, the EPC 1240 sends the LEMF 1253 the LI report via the delivery function 1251. At operation 1271, the EPC 1240 may send the D2D communication data to the peer UE 1210.

Figure 13:
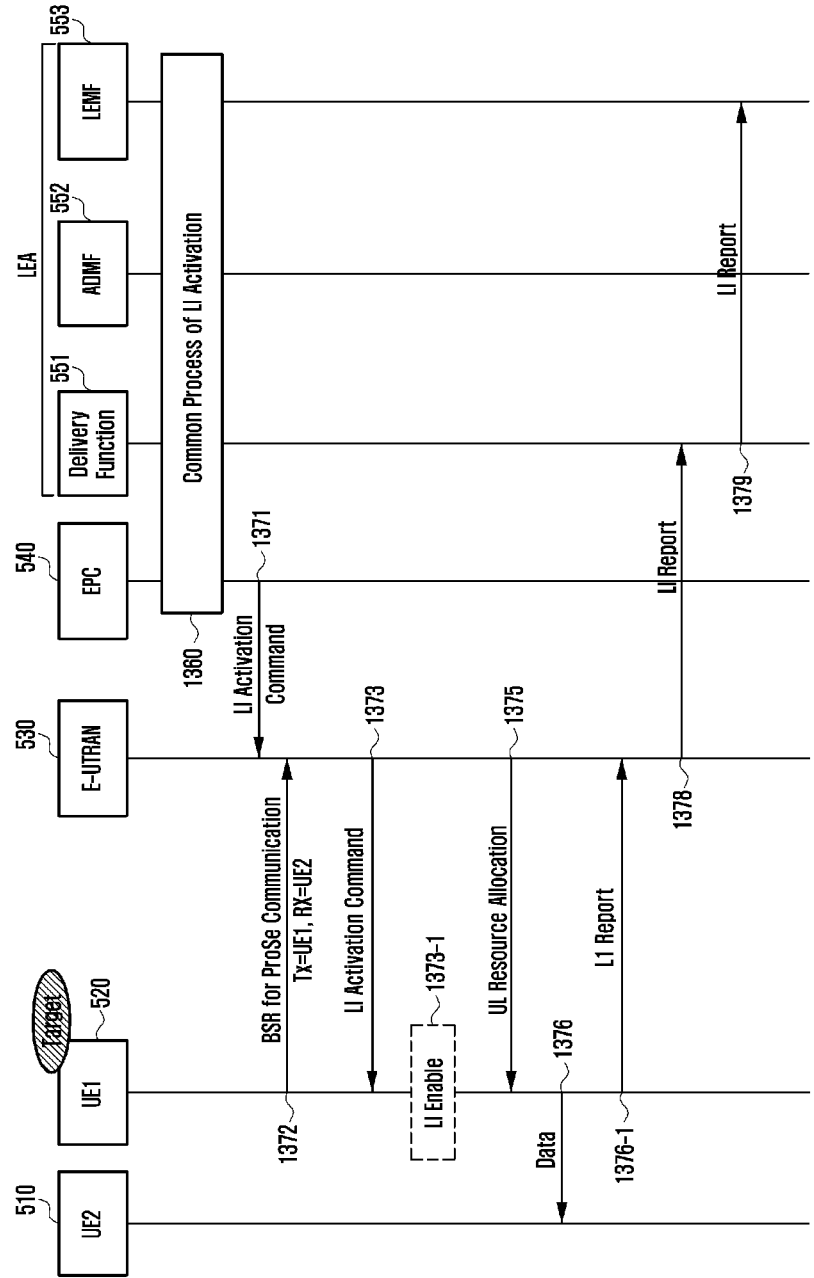
FIG. 13 is a signal flow diagram illustrating an LI procedure according to a seventh embodiment of the present disclosure.

FIG. 13 is a signal flow diagram illustrating an LI procedure according to a seventh embodiment of the present disclosure.

Referring to FIG. 13, at operation 1360, the EPC 540 and the LEA perform LI Activation process. The LI Activation process of operation 1360 may include operations 451 to 454 of FIG. 4. At operation 1371, the EPC 540 sends the E-UTRAN 530 the LI Activation Command to instruct LI to the target UE 520. The LI Activation Command may include LI conditions (e.g., interception time and interception request information). The E-UTRAN 530 may perform LI to the target UE 520 during the period indicated in the LI Activation Command.

The LI to the UE (e.g., the target UE 520 is triggered as in the methods described in the above embodiments (e.g., first and second embodiments of the present disclosure). According to various embodiments of the present disclosure, if the target UE 520 sends the E-UTRAN 530 the BSR to request for radio resource for D2D communication with the peer UE 510 within the period indicated in the LI Activation Command at operation 1372, then the LI of the E-UTRAN 530 is triggered. In response the LI Activation Command, at operation 1373, the E-UTRAN 530 sends the target UE 520 the LI Activation Command.

The LI Activation Command transmitted by the E-UTRAN 530 includes a command for managing the communication resource and direction of the target UE in order for the E-UTRAN 530 to intercept the D2D communication content of the target UE 520. The E-UTRAN 530 may adjust the managing resource and direction in such a way of opening the connections on resources for the D2D communication and E-UTRAN transfer simultaneously or transmitting information for allocating resources for uplink LI Report to the E-UTRAN at a time interval.

At operation 1375, the E-UTRAN 530 allocates transmission resource to the target UE 520 as described above. At operation 1376, the target UE 520 sends the peer UE 510 the data using the resource allocated by the E-UTRAN. If the simultaneous connection is applied, then at operation 1376-1, the target UE 520 transmits the D2D communication data generated by the target UE 520 to the E-UTRAN 530 through the resource and antenna as well as to the peer UE 510. If the E-UTRAN 530 allocates a C-RNTI for LI in uplink or transmits a resource block itself in another configuration method, then the D2D communication data generated by the target UE 520 is transmitted to the E-UTRAN 530 after the D2D communication between the UEs. For example, operation 1376-1 may follow operation 1376.

If the IRI and CC related to the target UE 520 are received, then at operation 1378, the E-UTRAN 530 sends the delivery function 551 of the LEA the LI report including the intercepted information. At this time, the LI report is transmitted over the IP network in such a way of encapsulating the LEA IP along with the PDCP level data packet using a function of the E-UTRAN 530 as proposed in the present disclosure. At operation 1379, the LEMF 553 receives the LI Report via the delivery function 551.

If the LI report arrives at the Delivery Function 551, the delivery function 551 performs the operation for acquiring the subscriber information using the IP included in the LI report in various sways. First, if the delivery function 551 sends the ProSe Function 240 the Tx and Rx information included in the LI Report, then the ProSe Function 240 sends the EPC 540 the EPC ID (S-TMSI) of the UE using a ID Mapping Table thereof, and the EPC 540 sends the delivery function 551 the Tx and Rx subscriber information. In another case, if the ProSe Function 240 is capable of mapping the IMSI and the D2D ID, then the ProSe Function 240 responds to the delivery function 551 immediately. Second, if the delivery function 551 sends the EPC 540 the Tx and Rx information, then the EPC 540 queries the ProSe function 240 about the information. The ProSe function 240 sends the EPC 540 the EPC ID (S-TMSI) of the UE using a ID Mapping Table thereof, and the EPC 540 sends the delivery function 551 the acquired Tx and Rx subscriber information. If the EPC 520 has the mapping table in both the cases, then the response process is performed inversely.

Figure 14:
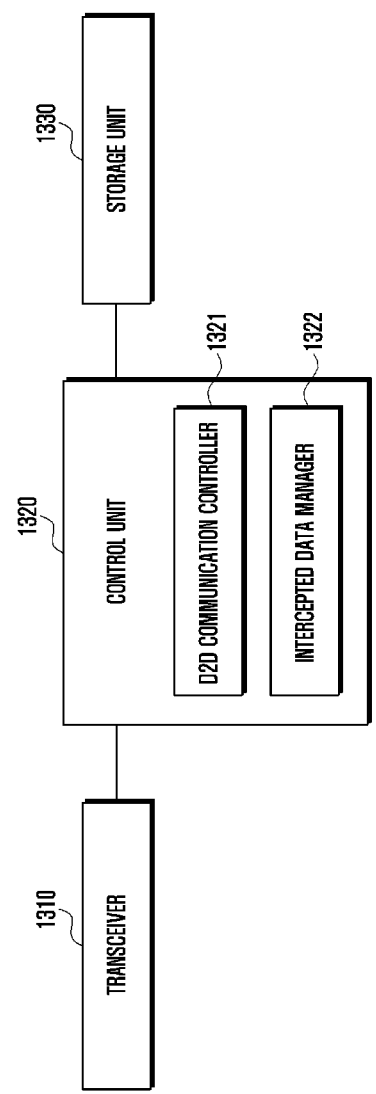
FIG. 14 is a block diagram illustrating a configuration of a UE according to an embodiment of the present disclosure

FIG. 14 is a block diagram illustrating a configuration of a UE according to an embodiment of the present disclosure.

Referring to FIG. 14, the UE according to an embodiment of the present disclosure includes a transceiver 1310, a control unit 1320, and a storage unit 1330. The control unit 1320 may include a D2D communication controller 1321 and an intercepted data manager 1322 for D2D communication and LI report of the UE. In the following, the description is directed only to the operations of the components that are directly related to the present disclosure.

The transceiver 1310 transmits and receives signals and data to and from a network and, particularly requests the network for D2D communication resource allocation and receives LI report command from the network under the control of the control unit 1320. The storage unit 1330 stores the Tx/Rx information of D2D communication under the control of the control unit 1320.

The D2D communication controller 1321 of the control unit 1320 may correspond to the ProSe APP of FIG. 2 and controls the transceiver 1310 to perform D2D communication. The intercepted data manager 1322 corresponds to the Delivery Function of FIG. 2 and transmits the LI Report message including the Tx/Rx information stored in the storage unit 1330. Because the LI operation of the UE has been described above, detailed description thereof is omitted herein.

Figure 15:
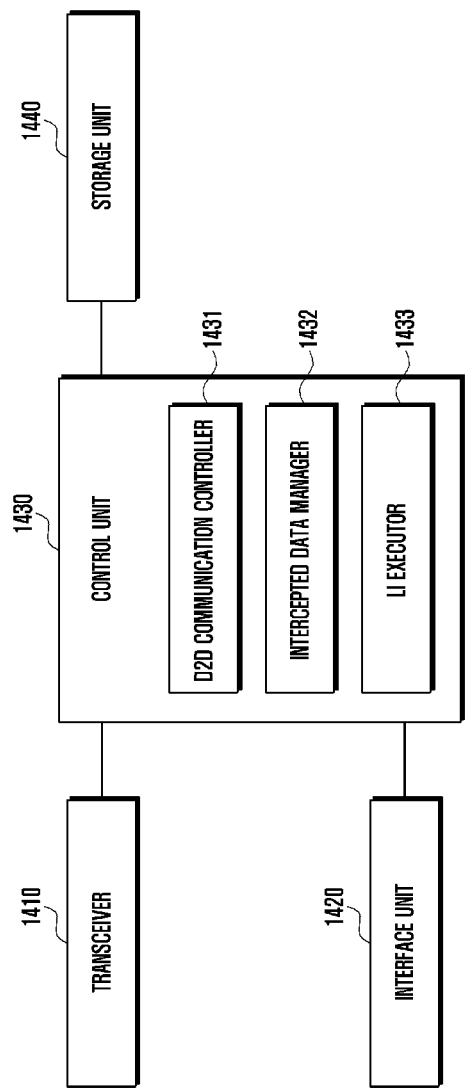
FIG. 15 is a block diagram illustrating a configuration of an evolved Node B (eNB) according to an embodiment of the present disclosure.

FIG. 15 is a block diagram illustrating a configuration of an evolved Node B (eNB) according to an embodiment of the present disclosure.

Referring to FIG. 15, the eNB according to an embodiment of the present disclosure includes a transceiver 1410, an interface unit 1420, a control unit 1430, and a storage unit 1440. The transceiver 1410 is responsible for communication with a UE through a radio interface, and the interface unit 1420 is responsible for communication with a core network. The storage unit 1440 stores various information necessary for performing the LI according to various embodiments of the present disclosure.

The control unit 1430 may include a D2D communication controller 1431, an intercepted data manager 1432, and an LI executor 1433. The D2D communication controller 1431 allocates D2D communication resource to an UE and adjusts transmit power of the UE for LI according to various embodiments of the present disclosure. The intercepted data manager 1432 may correspond to the Delivery Function and transmits the LI report from the UE to the core network. The LI executor 1433 may correspond to the ADMF of the LEA and transmits the LI command message to the UE according to the LI command from the core network. Because the LI operation of the eNB has been described above, detailed description thereof is omitted herein.

Figure 16:
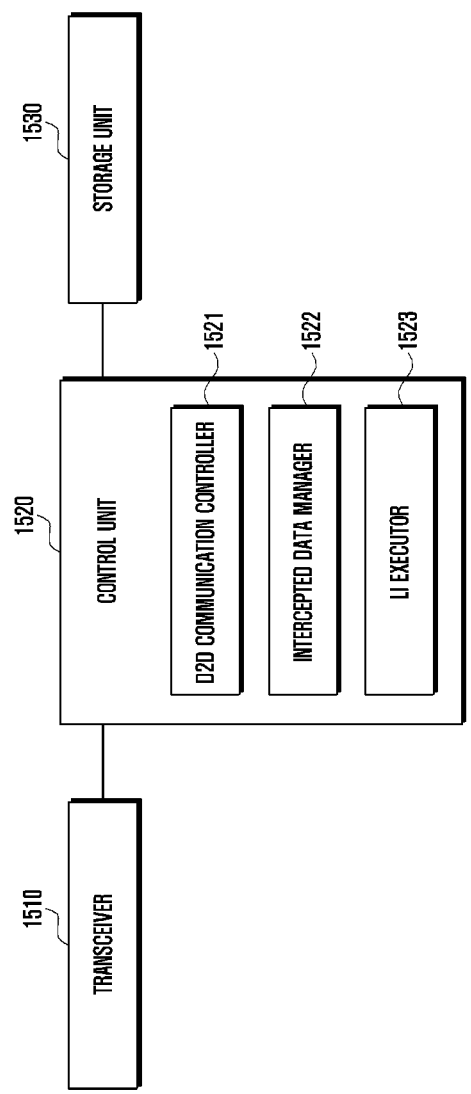
FIG. 16 is a block diagram illustrating a configuration of a proxy UE according to an embodiment of the present disclosure.

FIG. 16 is a block diagram illustrating a configuration of a proxy UE according to an embodiment of the present disclosure.

Referring to FIG. 16, the proxy UE according to an embodiment of the present disclosure includes a transceiver 1510, a control unit 1520, and a storage unit 1530. The control unit 1520 includes a D2D communication controller 1521 for controlling LI process, an intercepted data manager 1522, and an LI executor 1523.

The transceiver 1510 transmits and receives signals and data to and from the network and the target UE under the control of the control unit 1520. The storage unit 1530 may store various information necessary for the LI process such as a target list generated with discovery code of the UE according to various embodiments of the present disclosure.

The control unit 1520 may include a D2D communication controller 1521, an intercepted data manager 1522, and an LI executor 1523. The D2D communication controller 1521 is a component for controlling the target UE to join the discovery process, and the intercepted data manager 1522 is a component for reporting the information acquired through LI to the target UE. The LI executor 1523 commands the target UE to perform LI report.

Figure 17:
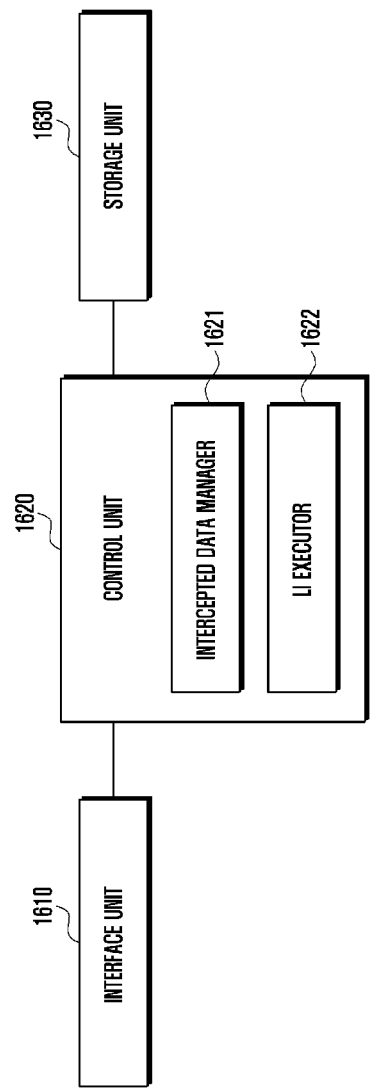
FIG. 17 is a block diagram illustrating a configuration of an Interception device of a Law Enforcement Agency (LEA) according to an embodiment of the present disclosure.

FIG. 17 is a block diagram illustrating a configuration of an Interception device of an LEA according to an embodiment of the present disclosure.

Referring to FIG. 17, the interception device according to an embodiment of the present disclosure includes a transceiver 1610, a control unit 1620, and a storage unit 1630.

The interface unit 1610 is responsible for communication with a core network, and the storage unit 1630 stores various information necessary for the LI process. The control unit 1620 may include an intercepted data manager 1621 and an LI executer 1622. The intercepted data manager 1621 may correspond to the Delivery Function and receives the LI report from the core network. The LI executor 1622 may correspond to the ADMF and performs authentication to the EPC for LI.

As described above, the method and apparatus for LI to D2D UE according to the present disclosure is advantageous in terms of intercepting information exchanged between D2D UEs communicating without involvement of any network entity.

It will be appreciated that various embodiments of the present disclosure according to the claims and description in the specification can be realized in the form of hardware, software or a combination of hardware and software.

Any such software may be stored in a non-transitory computer readable storage medium. The non-transitory computer readable storage medium stores one or more programs (software modules), the one or more programs comprising instructions, which when executed by one or more processors in an electronic device, cause the electronic device to perform a method of the present disclosure.

Any such software may be stored in the form of volatile or non-volatile storage such as, for example, a storage device like a Read Only Memory (ROM), whether erasable or rewritable or not, or in the form of memory such as, for example, Random Access Memory (RAM), memory chips, device or integrated circuits or on an optically or magnetically readable medium such as, for example, a Compact Disk (CD), Digital Versatile Disc (DVD), magnetic disk or magnetic tape or the like. It will be appreciated that the storage devices and storage media are various embodiments of non-transitory machine-readable storage that are suitable for storing a program or programs comprising instructions that, when executed, implement various embodiments of the present disclosure. Accordingly, various embodiments provide a program comprising code for implementing apparatus or a method as claimed in any one of the claims of this specification and a non-transitory machine-readable storage storing such a program.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A lawful interception (LI) method of a terminal, the method comprising:
   communicating with a peer terminal through a device-to-device (D2D) communication:
   identifying usage information exchanged with the peer terminal; and
   transmitting, from the terminal to a proximity-based services (ProSe) function, an (LI) report including the usage information directly,
   wherein the usage information is transmitted from the ProSe function to a law enforcement maintenance facility (LEMF) after the terminal transmits the (LI) report to the ProSe function directly.

2. The method of claim 1, wherein the usage information is needed to perform the LI by the ProSe function.

3. The method of claim 1, wherein the usage information is at least one of interception related information (IRI) and content of communication (CC).

4. The method of claim 1, wherein the LI report further includes at least one of layer 2 Identifiers (IDs) of a transmitter and a receiver, layer 3 IDs, group ID, and LI time.

5. The method of claim 1, wherein the terminal transmits the LI report including the usage information to the ProSe function periodically, if the terminal is in a coverage area.

6. The method of claim 1,
   wherein the terminal starts, if the terminal is out of a coverage area, storage of the usage information, and
   wherein the terminal transmits, if the terminal enters back into the coverage area, the LI report including the usage information to the ProSe function.

7. A lawful interception (LI) method of a proximity-based services (ProSe) function, the method comprising:
   receiving, from a terminal to the ProSe function, an LI report including usage information directly, if the usage information is needed to perform the LI by the ProSe function; and
   transmitting, to a delivery function, the usage information,
   wherein the usage information exchanged with a peer terminal is identified by the terminal, and
   wherein the usage information is transmitted from the ProSe function to a law enforcement maintenance facility (LEMF) after the ProSe function receives the LI report from the terminal directly.

8. The method of claim 7, wherein the usage information is at least one of interception related information (IRI) and content of communication (CC).

9. The method of claim 7, wherein the LI report further includes at least one of layer 2 Identifiers (IDs) of a transmitter and a receiver, layer 3 IDs, group ID, and LI time.

10. The method of claim 7, wherein the ProSe function receives the LI report including the usage information from the terminal periodically, if the terminal is in a coverage area.

11. The method of claim 7,
    wherein the usage information is stored, if the terminal is out of a coverage area, and
    wherein the ProSe function receives the LI report including the usage information from the terminal, if the terminal enters back into the coverage area.

12. A terminal for performing (LI), the terminal comprising:
- a transceiver configured to transmit and receive a signal; and a controller configured to control:
- communicating with a peer terminal through a device-to-device (D2D) communication,
- identifying usage information exchanged with the peer terminal, and
- transmitting, to a proximity-based services (ProSe) function, an LI report including the usage information directly,
- wherein the usage information is transmitted from the ProSe function to a law enforcement maintenance facility (LEMF) after the terminal transmits the LI report to the ProSe function directly.

13. The terminal of claim 12, wherein the usage information is needed to perform the LI by the ProSe function.

14. The terminal of claim 12, wherein the LI report further includes at least one of layer 2 Identifiers (IDs) of transmitter and receiver, layer 3 IDs, group ID, and LI time.

15. The terminal of claim 12, wherein the terminal transmits the LI report including the usage information to the ProSe function periodically, if the terminal is in a coverage area.

16. The terminal of claim 12,
- wherein the terminal starts, if the terminal is out of a coverage area, storage of the usage information, and
- wherein the terminal transmits, if the terminal enters back into the coverage area, the LI report including the usage information to the ProSe function.

17. A proximity-based services (ProSe) function for performing lawful interception (LI), the ProSe function comprising:
- a transceiver configured to transmit and receive a signal; and
- a controller configured to control:
- receiving, from a terminal, an LI report including usage information directly, if the usage information is needed to perform the LI by the ProSe function, and
- transmitting, to a delivery function, the usage information, wherein the usage information exchanged with a peer terminal is identified by the terminal, and
- wherein the usage information is transmitted from the ProSe function to a law enforcement maintenance facility (LEMF) after the ProSe function receives the LI report from the terminal directly.

18. The ProSe function of claim 17, wherein the LI report further includes at least one of layer 2 Identifiers (IDs) of a transmitter and a receiver, layer 3 IDs, group ID, and LI time.

* * * * *